US006832639B2

(12) United States Patent
Lemens et al.

(10) Patent No.: US 6,832,639 B2
(45) Date of Patent: Dec. 21, 2004

(54) MASTER PROCESSING APPARATUS

(75) Inventors: Paul J. Lemens, Scottsdale, AZ (US); Joseph Elijio Velasquez, Gilbert, AZ (US); Ronald J. Hoffman, Phoenix, AZ (US); Daniel G. Reed, Mesa, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

(21) Appl. No.: 10/660,630

(22) Filed: Sep. 12, 2003

(65) Prior Publication Data

US 2004/0045678 A1 Mar. 11, 2004

Related U.S. Application Data

(62) Division of application No. 09/987,484, filed on Nov. 14, 2001, now Pat. No. 6,698,487.
(60) Provisional application No. 60/248,217, filed on Nov. 15, 2000.

(51) Int. Cl.$^7$ ............................................. B32B 31/00
(52) U.S. Cl. ........................... 156/555; 156/582
(58) Field of Search ................... 156/494, 555, 156/580, 582, 583.1; 100/155 R, 160, 176

(56) References Cited

U.S. PATENT DOCUMENTS

| | | |
|---|---|---|
| 2,507,683 A | 5/1950 | Smith |
| 2,647,299 A | 8/1953 | Thomas |
| 2,975,824 A | 3/1961 | Schenkengel |
| 2,977,271 A | 3/1961 | Lutwack |
| 2,991,214 A | 7/1961 | Burkholder |
| 3,027,285 A | 3/1962 | Eisner et al. |
| 3,301,117 A | 1/1967 | Spaulding |
| 3,309,983 A | 3/1967 | Dresser |
| 3,367,225 A | 2/1968 | Stanford et al. |
| 3,453,169 A | 7/1969 | Buck et al. |
| 3,533,886 A | 10/1970 | Staats et al. |
| 3,737,359 A | 6/1973 | Levitan |
| 3,756,897 A | 9/1973 | Shields et al. |
| 3,840,420 A | 10/1974 | Sarcia |
| 3,901,758 A | 8/1975 | Humphries |
| 3,944,455 A | 3/1976 | French |
| 3,962,021 A | 6/1976 | Weisfeld |
| 3,974,552 A | 8/1976 | Minogue et al. |
| 4,016,021 A | 4/1977 | La Fleur |

(List continued on next page.)

FOREIGN PATENT DOCUMENTS

| | | |
|---|---|---|
| CA | 550377 | 12/1957 |
| EP | 0 291 178 | 11/1988 |
| GB | 2 199 010 | 6/1988 |
| JP | 54-36139 | 11/1970 |
| JP | 60-40272 | 10/1995 |
| JP | 11-245296 | 9/1999 |
| JP | 11-245297 | 9/1999 |
| JP | 11-245299 | 9/1999 |
| JP | 11-254528 | 9/1999 |
| JP | 11-278416 | 10/1999 |
| JP | 2000-37775 | 2/2000 |
| JP | 2000-168020 | 6/2000 |
| JP | 2000-272005 | 10/2000 |
| JP | 2001-79940 | 3/2001 |
| JP | 2001-79942 | 3/2001 |
| JP | 2001-79943 | 3/2001 |
| JP | 2001-79946 | 3/2001 |
| JP | 2001-96617 | 4/2001 |
| JP | 2001-96619 | 4/2001 |
| JP | 2001-277357 | 10/2001 |
| WO | WO99/24257 | 5/1999 |

*Primary Examiner*—James Sells
(74) *Attorney, Agent, or Firm*—Pillsbury Winthrop LLP

(57) ABSTRACT

A master processing apparatus for use with a pair of removable feed rolls carrying a supply of stock material includes a frame and a master processing assembly operable to cause adhesive bonding between the stock materials and a master. The apparatus includes a cutting assembly and a movable feed tray. A master engaging structure engages the master as it is being processed.

21 Claims, 18 Drawing Sheets

U.S. PATENT DOCUMENTS

| | | |
|---|---|---|
| 4,021,288 A | 5/1977 | Hannon et al. |
| 4,060,441 A | 11/1977 | Ohta et al. |
| 4,151,900 A | 5/1979 | Kirwan |
| 4,194,273 A | 3/1980 | Williams |
| 4,226,664 A | 10/1980 | Shaffer |
| 4,264,400 A | 4/1981 | Breitmar |
| 4,336,096 A | 6/1982 | Dedekind |
| 4,351,690 A | 9/1982 | George |
| 4,377,434 A | 3/1983 | Del Bianco et al. |
| 4,387,000 A | 6/1983 | Tancredi |
| 4,619,728 A | 10/1986 | Brink |
| 4,743,325 A | 5/1988 | Miyake |
| 4,758,952 A | 7/1988 | Harris, Jr. et al. |
| 4,840,698 A | 6/1989 | Kuehnert |
| 4,859,274 A | 8/1989 | Marvel |
| 4,921,556 A | 5/1990 | Hakiel et al. |
| 5,053,099 A | 10/1991 | Seki et al. |
| 5,098,759 A | 3/1992 | Felix |
| 5,102,491 A | 4/1992 | Correa et al. |
| 5,133,828 A | 7/1992 | Jacques |
| 5,163,349 A | 11/1992 | Takagi et al. |
| 5,279,697 A | 1/1994 | Peterson et al. |
| 5,292,388 A | 3/1994 | Candore |
| 5,295,753 A | 3/1994 | Godo et al. |
| 5,322,001 A | 6/1994 | Boda |
| 5,334,431 A | 8/1994 | Longtin |
| 5,368,677 A | 11/1994 | Ueda et al. |
| 5,445,700 A | 8/1995 | Uang |
| 5,480,509 A | 1/1996 | Matsuo et al. |
| 5,571,368 A | 11/1996 | Barge |
| 5,579,093 A | 11/1996 | Wagner et al. |
| 5,580,417 A | 12/1996 | Bradshaw |
| 5,582,669 A | 12/1996 | Gove et al. |
| 5,584,962 A | 12/1996 | Bradshaw et al. |
| 5,639,339 A | 6/1997 | Couillard |
| 5,718,799 A | 2/1998 | Colson et al. |
| 5,735,997 A | 4/1998 | Reinders |
| 5,735,998 A | 4/1998 | Bradshaw |
| 5,783,024 A | 7/1998 | Forkert |
| 5,788,796 A | 8/1998 | Look et al. |
| 5,788,806 A | 8/1998 | Bradshaw et al. |
| 5,804,032 A | 9/1998 | Reinders |
| 5,810,967 A | 9/1998 | Couillard et al. |
| 5,853,531 A | 12/1998 | Murphy et al. |
| 5,888,342 A | 3/1999 | Reinders |
| RE36,198 E | 4/1999 | Couillard et al. |
| 5,919,333 A | 7/1999 | Maltby et al. |
| 5,961,779 A | 10/1999 | Bradshaw |
| 5,985,088 A | 11/1999 | Couillard et al. |
| 6,059,003 A | 5/2000 | Wittkopf |
| 6,149,752 A | 11/2000 | Matthews et al. |
| 6,159,327 A | 12/2000 | Forkert |
| 6,270,612 B1 | 8/2001 | Bradshaw |
| RE37,345 E | 9/2001 | Bradshaw et al. |
| 6,381,429 B1 | 4/2002 | Shibata et al. |
| 6,427,744 B2 | 8/2002 | Seki et al. |
| 6,431,243 B1 | 8/2002 | Ito et al. |
| 6,431,244 B1 | 8/2002 | Moriguchi et al. |
| 6,523,592 B2 | 2/2003 | Kuki |
| 6,550,516 B2 | 4/2003 | Moriguchi et al. |
| 6,578,618 B2 | 6/2003 | Ito et al. |
| 6,675,854 B2 * | 1/2004 | Worth ........................ 156/555 |
| 6,698,487 B2 * | 3/2004 | Lemens et al. ............. 156/494 |
| 2001/0004922 A1 | 6/2001 | Seki et al. |

* cited by examiner

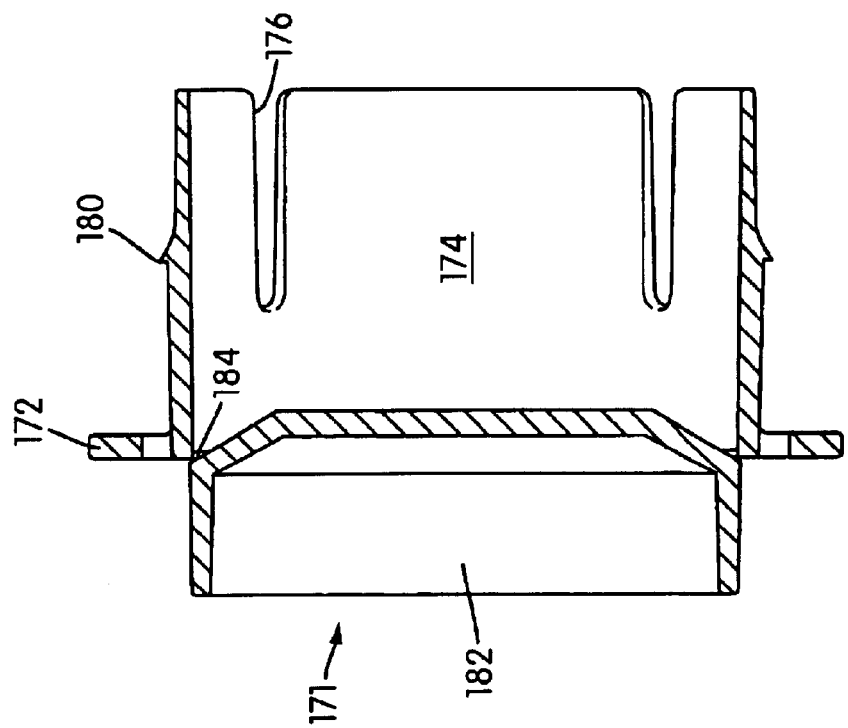
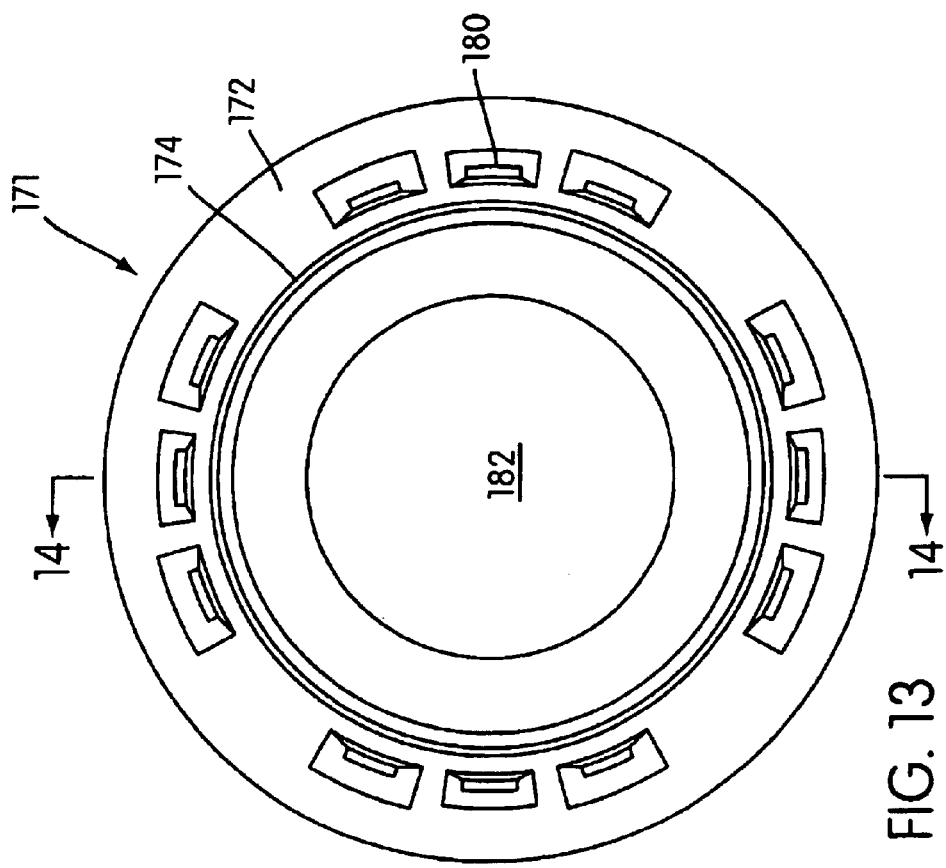
FIG. 14
FIG. 13

MASTER PROCESSING APPARATUS

The present application is a division of U.S. application Ser. No. 09/987,484, filed Nov. 14, 2001 U.S. Pat. No. 6,698,487, which claims priority to provisional patent application No. 60/248,217 filed Nov. 15, 2000, which application is hereby incorporated by reference in its entirety into the present application for all material disclosed therein.

FIELD OF THE INVENTION

The present invention is related to a master processing apparatus for performing a master processing operation on a selected substrate.

BACKGROUND OF THE INVENTION

Master processing apparatuses, such as laminating apparatuses and adhesive transfer apparatuses, are well-known in the art. These apparatuses typically include a frame to which a pair of feed rolls are mounted (either individually or in cartridge). A master processing assembly is provided in the frame and the stock materials on the feed roll are unwound and fed into the processing assembly. A power-operated or hand-operated actuator may be included in the master processing apparatus to actuate the processing assembly. A master (such as a photograph, printout, business card or any other selected substrate or document) to be processed is fed into the processing assembly and the processing assembly causes adhesive from one or both the stock materials to bond to the master.

In laminating operations, both stock materials are laminating films coated with pressure-sensitive or heat-sensitive adhesive and these films are both adhered to the opposing sides of the master. In adhesive transfer operations, one of the stock materials is a release liner on which a layer of adhesive is coated and the other is an aggressive or non-aggressive mask. During the operation, the adhesive on the release liner is transferred to one side of the master and, if the mask substrate is aggressive (i.e. has an affinity for adhesive bonding), then any excess adhesive will transfer to the mask substrate, which is then peeled off to expose the master on the release liner and remove the excess adhesive. For further details on these operations, reference may be made to U.S. Pat. Nos. 5,580,417 and 5,584,962.

In any master processing apparatus, the feed rolls of stock material must periodically be replaced. The above-mentioned '962 patent discloses an advantageous arrangement that facilitates loading the lead ends of the stock materials in between the nip rollers of a master processing assembly. In the '962 patent, the upper portion of the frame pivots relative to the bottom portion between open and closed positions. An upper nip roller is rotatably mounted on the upper frame portion and a lower nip roller is rotatably mounted on the lower frame portion. As a result, pivoting the upper frame portion to its open position separates the nip rollers to facilitate placement of the stock material lead ends between the nip rollers. Upon moving the upper frame portion to its closed position, the nip rollers will be engaged together in pressure applying relation.

It is advantageous, however, that the nip rollers be accurately aligned with one another when they are engaged in pressure applying relation. If the rollers are not properly aligned (by being, for example, parallel, but spaced too far apart, or by being skewed out of parallel alignment with one another), they cannot apply equal, uniform pressure to all portions of the sheets of stock material therebetween and the resulting final product may be of inferior or unacceptable quality. In the construction of the '962 patent, if wear occurs at the pivotal connection between the upper and lower frame portions, then the frame portions may unintentionally shift relative to one another due to the loose play in the pivotal connection. As a result, the nip rollers may not be brought into proper pressure applying relation when brought together during movement of the upper frame portion into the closed position thereof.

To obviate the above-described problem, one aspect of the present invention provides a master processing apparatus for use with a pair of removable feed rolls, each carrying a supply of stock material to be unwound and at least one of the stock materials having a layer of adhesive provided thereon. The apparatus includes a frame having a first frame portion and a second frame portion movably connected for movement relative to one another between open and closed positions. A pair of cooperating pressure applying structures are mounted within the frame, the cooperating structures being constructed and arranged to be positioned adjacent one another in a cooperating pressure applying relationship wherein, when the master with the first and second stock materials on opposing sides thereof and the adhesive contacting the master is positioned between the cooperating structures, the cooperating structures apply pressure to the master and stock materials as they pass therebetween so as to affect adhesive bonding between the master and the stock materials. One of the pair of cooperating pressure applying structures is mounted on the first frame portion and the other of the pair of cooperating pressure applying structures is mounted on the second frame portion such that (a) movement of the frame portions into their open positions moves the pressure applying structures apart from one another into an open access position to facilitate positioning of the stock materials therebetween and (b) movement of the frame portions into their closed positions moves the pressure applying structures into engagement with one another and into pressure applying engagement with the portion of the stock materials positioned therebetween. The apparatus further includes guide structure providing a guide surface constructed and arranged to guide the movement of the pressure applying structures into their engaged positions.

It is also known in the art to provide a cutting apparatus on a master processing apparatus at the discharge opening to sever the processed master from the continuous supply of stock material. For example, International Application PCT US98/23237 and the counterpart U.S. Pat. No. 6,244,322 discloses a master processing apparatus wherein the cutting apparatus has a cutting blade that is moved transversely to cut through the processed stock materials. In the disclosed arrangement, the blade is always positioned so that transverse movement thereof will cut through the materials on the apparatus' exit tray or other substrate supporting surface. Specifically, the blade extends into a groove to ensure that lateral movement thereof cuts through the materials on that surface. This arrangement presents a risk of accidentally cutting through the master by moving the blade by bumping into or otherwise accidentally contacting the blade carrier and pushing the blade edge into contact with the master. Likewise, the user could accidentally cut the processed stock materials at the wrong point. In either of these situations, the operation must be performed over again.

To solve the problem described above, another aspect of the present invention provides a master processing apparatus for use with a pair of removable feed rolls, the removable feed rolls each carrying a supply of stock material to be unwound and at least one of the stock materials having a layer of adhesive provided thereon. The apparatus includes a frame constructed and arranged to removably mount the feed rolls. The frame is constructed and arranged such that, when the feed rolls are removably mounted thereto, a master can be inserted into the master processing assembly together with the stock materials unwound from their respective feed rolls and disposed on opposing sides of the master. The master processing assembly is constructed and arranged to perform a master processing operation wherein the processing assembly causes adhesive bonding between the master and the stock materials fed into the feed side thereof and subsequently discharges the processed master and stock materials outwardly from a discharge side thereof. The frame provides a substrate supporting surface positioned on the discharge side of the processing assembly. The substrate processing surface is configured to receive and support the processed master and stock materials discharged from the processing assembly in a substantially flat relation. A cutting assembly is disposed on the discharge side of the master processing assembly. The cutting assembly includes a guide member extending transversely with respect to the frame and a blade mounted on the guide member for guided transverse cutting movement therealong. The guide member is movably mounted to the frame for selective manual movement between (a) an inoperative position wherein the blade is positioned in spaced relation above the substrate supporting surface to prevent the blade from cutting through the processed master and stock materials and (b) an operative position wherein the blade is positioned such that a portion thereof extends downwardly below the substrate supporting surface so that the downward extent of the blade portion enables the blade to cut through an entire thickness of the processed master and stock materials during the transverse cutting movement.

Because at least one of the stock materials on the feed rolls is coated with an adhesive, it is advantageous that the unwound portions of the sheets of stock material not be exposed to dust or debris. Generally, the unwound portions of the stock materials extend between the associated feed roll and the master processing assembly. The stock material sheets are oriented such that the adhesive-coated side generally faces the feed opening of the apparatus. Thus, it is particularly advantageous to prevent debris from entering the feed opening of the apparatus when the master processing apparatus is not in use to prevent or reduce the chance of exposure of each adhesive layer to debris and foreign matter. In the event that debris or other foreign matter becomes adhered on the adhesive layer, it can reduce the effectiveness of the adhesive's bonding and, if the stock material is a transparent laminating film, can degrade the resulting product's appearance.

To solve this problem, another aspect of the present invention provides a master processing apparatus for use with a pair of removable feed rolls, each removable feed roll carrying a supply of stock material to be unwound and at least one of the stock materials having a layer of adhesive provided thereon. The apparatus includes a frame constructed and arranged to removably mount the feed rolls. The frame has an opening at a feed side thereof. A master processing assembly is mounted in the frame. The frame is constructed and arranged such that, when the feed rolls are removably mounted thereto, a master can be inserted through the opening on the feed side of the frame and into the master processing assembly together with the stock materials unwound from their respective feed rolls and disposed on opposing sides of the master. The master processing assembly is constructed and arranged to perform a master processing operation wherein the processing assembly causes adhesive bonding between the master and stock materials being fed in a feed side thereof and subsequently discharges the processed master and stock materials outwardly from a discharge side thereof. A feed tray having a substrate supporting surface is movably mounted to the frame on the feed side of the master processing assembly for selective movement between (a) an operative position wherein the tray extends outwardly from the master processing assembly with the substrate supporting surface thereof positioned to support the master in substantially flat relation during feeding of the master into the master processing assembly and (b) an inoperative position wherein the tray is positioned in covering relation to the opening of the frame to inhibit ingress of undesired objects into the master processing assembly via the opening.

Now turning to another aspect of the invention, in conventional apparatuses, the operator initially pushes the master through the feed opening in the apparatus and into engagement with the nip rollers. The master is supported on a feed tray from the feed opening to the nip rollers. Once the master is engaged with the nip rollers, the driving rotational movement of the nip rollers pulls the unlaminated portion of the master through the nip rollers and pushes the laminated portion toward the discharge opening. The portion of the master that is being laminated should be flat and wrinkle free. It is known to provide a wiper on the feed side of the nip rollers to smooth and tension the master as it is being pulled between the nip rollers. This smoothing action assures a wrinkle-free final laminated product. An example of a wiper for tensioning the master is shown in commonly assigned U.S. Pat. No. 5,788,806 to Bradshaw et. al. The wiper is mounted on the feed tray of the apparatus and is manually operable by manipulating a spring biased arm that extends out of the feed opening of the '806 apparatus. It is desirable to engage and smooth the master as close to the nip rollers as possible. It is also desirable to mount the feed rolls in a cartridge that can be easily installed in and removed from the apparatus yet have the feed rolls as close to the nip rollers as possible to minimize the length of the unwound portion of the stock materials between feed rolls and the nip rollers. However, positioning both the feed rolls and the wiper close to the nip rollers, as shown in the '806 patent, has heretofore has required the cartridge and apparatus to be designed such that the cartridge is moved forwardly over the feed tray for mounting to the rear side of the apparatus.

To obviate the need for such a construction, another aspect of the present invention provides a removable cartridge to be used in conjunction with a master processing apparatus for processing a master, the apparatus including a frame and a master processing assembly constructed and arranged to perform a master processing operation wherein the processing assembly causes adhesive bonding between substrates fed therein. The cartridge includes a cartridge body structure constructed and arranged to be removably mounted to the apparatus frame. The first and second feed rolls each carry a supply of first and second stock materials and are mounted to the cartridge body structure to enable the stock materials to be unwound from their respective feed rolls. At least one of the stock materials has a layer of adhesive disposed thereon. The cartridge body structure and the first and second feed rolls are constructed and arranged such that, when the cartridge body structure is removably mounted to the apparatus frame, the master can be inserted into the master processing assembly of the apparatus with the first and second stock materials being unwound from their respective feed rolls and disposed on opposing sides of the master, thereby enabling the actuator to be operated to cause the processing assembly to perform the aforesaid master processing operation. During the master processing operation, the master processing assembly causes adhesive bonding between the first and second stock materials and the master fed therein and then subsequently discharges the processed master and stock materials. The cartridge has a substrate supporting member extending between the sidewalls thereof that provides a substrate supporting surface. The substrate supporting member is positioned with respect to the cartridge body structure such that, when the cartridge body structure is removably mounted to the apparatus frame, the substrate supporting surface thereof is positioned on the feed side of the master processing assembly. The substrate supporting surface is configured to support the master in substantially flat relation during feeding of the master into the master processing assembly. The cartridge includes a master engaging structure extending generally transversely across the substrate supporting surface. The master substrate engaging structure has a master engaging surface that engages the master while supported on the substrate supporting surface so as to apply frictional resistance to advancement of the master in a feeding direction to thereby tension the master. This arrangement allows the apparatus to use a removable cartridge architecture of the vertically inserted type and allows the master engaging structure to be positioned close to the processing assembly to thereby minimize the length of the master left untensioned after the trailing edge of the master passes the engaging structure. Alternatively, this aspect of the invention could be applied to horizontally inserted cartridges.

With respect to another aspect of the invention, typically each feed roll is comprised of the tubular core and a supply of stock material wound around the core. Each feed roll is rotatably mounted within the frame by a pair of end caps mounted at each end of the core. Typically a core is constructed of cardboard or similar material. Prior constructions use glue to mount the end caps to the core. Glue is applied, for example, to the interior at each end of the core, an end cap is inserted in each end of the core, and the glue is allowed to dry. There are many problems with this construction and method of construction. First, glue is difficult to apply to the interior ends on a tube, particularly in an automated process. Glue is also messy and time-consuming because the manufacturing process must be paused to allow time for the glue to dry. It would be advantageous to provide a method of mounting an end cap to a tubular core that is fast, reliable, economical and that does not involve the use of a glue.

Accordingly, another aspect of the present invention provides a feed roll configured to be mounted into a frame of a master processing apparatus in which a master processing operation is performed, the feed roll including a tubular core carrying a supply of a stock material wound thereon and a pair of end caps. Each end cap has a tubular core securing portion and a mounting portion connected to the core securing portion. The mounting portion of each end cap is constructed and arranged to allow the core and the stock material to be rotatably mounted to the apparatus frame in an operative position to enable the stock material to be unwound for the master processing operation. The core securing portions are inserted in opposing ends of the core and a pair of expansion members are inserted into the core securing portion of each end cap to radially expand the core securing portions of the end caps into a force fit relation with the interior surface of the core to secure the end caps to the core.

The end caps are used to rotatably mount each end of a feed roll within a frame. The free end of the strip of stock material on each roll is then threaded through the nip rollers. An unwound portion of each strip of stock material extends generally from the associated feed roll to the nip rollers. The driving action of the nip rollers during a master processing operation pulls the strips of stock material therebetween, thereby causing each feed roll to rotate in a sheet-unwinding direction. It is not desirable for the feed rolls to rotate at a rate faster than is required by the rotation of the nip rollers because this may cause wrinkling of the stock materials on the master or may cause the adhesive-coated side of one or both unwound portions of stock material to adhere to themselves. Prior art feed rolls have been of the "freewheeling" type which provide no significant resistance to the rotational movement of each feed roll in an unwinding direction. There is a need for a feed roll mounting structure that provides sufficient resistance to the rotational movement of each feed roll in an unwinding direction to prevent each feed roll from rotating at a rate faster than is required to feed the nip rollers. To meet this need, the present invention provides a feed roll assembly to be used in conjunction with an apparatus for performing a master processing operation, the apparatus including a frame and a master processing assembly constructed and arranged to perform a master processing operation wherein the processing assembly causes adhesive bonding between adhesive carrying substrates fed therein. The feed roll assembly includes a feed roll having a core about which a supply of stock material is wound and a generally radially extending annular flange fixedly mounted at an opposing end of the core. The feed roll assembly further includes feed roll mounting structure constructed and arranged to removably mount the feed roll to the frame of the apparatus. The feed roll mounting structure provides a pre-tension brake which provides a pair of brake surfaces frictionally engaging opposing sides of the flange such that, when the feed roll mounting structure is removably mounted on the apparatus frame and the stock material is being unwound from the core, the core with the flange fixed thereon rotates relative to the feed roll mounting structure so that braking friction is created between the core and the braking surfaces of the pre-tensioning brake.

When one or stock materials is coated with an adhesive, the force required to unwind the stock materials varies, depending on the radius of the roll. Generally, the larger the radius of the roll, the more force is required to unwind the stock materials. This change in the amount of force required to unwind the stock materials is disadvantageous. Generally it is better to provide the apparatus with a more consistent feel to make operation of the apparatus easier for the operator. Accordingly, the present invention also provides a master processing apparatus for use with a pair of removable feed rolls, the removable feed rolls each carrying a supply of stock material to be unwound, at least one of the stock materials having a layer of adhesive provided thereon. The apparatus includes a frame having an opening at a feed side thereof, a pair of feed roll mounting structures constructed and arranged to removably rotatably mount the pair of feed rolls in the frame for unwinding rotational movement of the feed rolls with respect to the frame and a master processing assembly. The frame is constructed and arranged such that, when the feed rolls are removably mounted thereto, a master can be inserted through the opening in the feed side of the frame and into the master processing assembly together with the stock materials unwound from their respective feed rolls and disposed on opposing sides of the master. The master processing assembly is constructed and arranged to perform a master processing operation wherein the processing assembly causes adhesive bonding between the master and stock materials being fed in a feed side thereof and subsequently discharges the processed master and stock materials outwardly from a discharge side thereof. Each feed roll mounting structure is constructed and arranged to apply braking tension to the associated feed roll such that the braking tension progressively decreases as the stock material carried on the associated feed roll is unwound.

Other aspects, features and advantages of the present invention will become apparent from the following detailed description, the accompanying drawings, and the appended claims.

BRIEF DESCRIPTION OF THE DRAWINGS

FIG. 13 is an end view of the end cap of FIG. 12;

FIG. 14 is a cross-sectional view taken along the line 14—14 in FIG. 13;

DETAILED DESCRIPTION OF THE INVENTION

Figure 1:
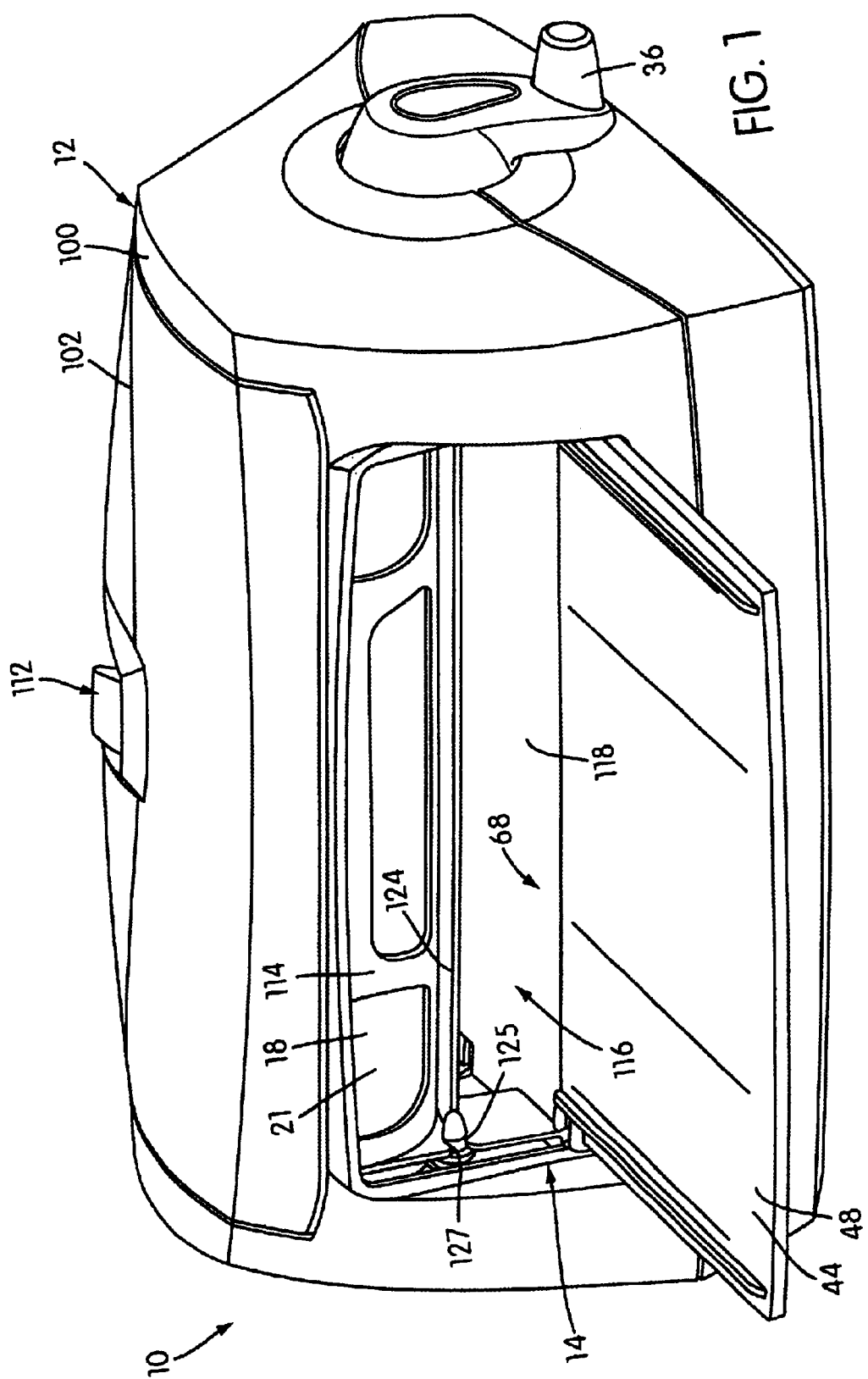
FIG. 1 is a perspective view of a feed side of a master processing apparatus constructed according to the principles of the present invention.
Figure 2:
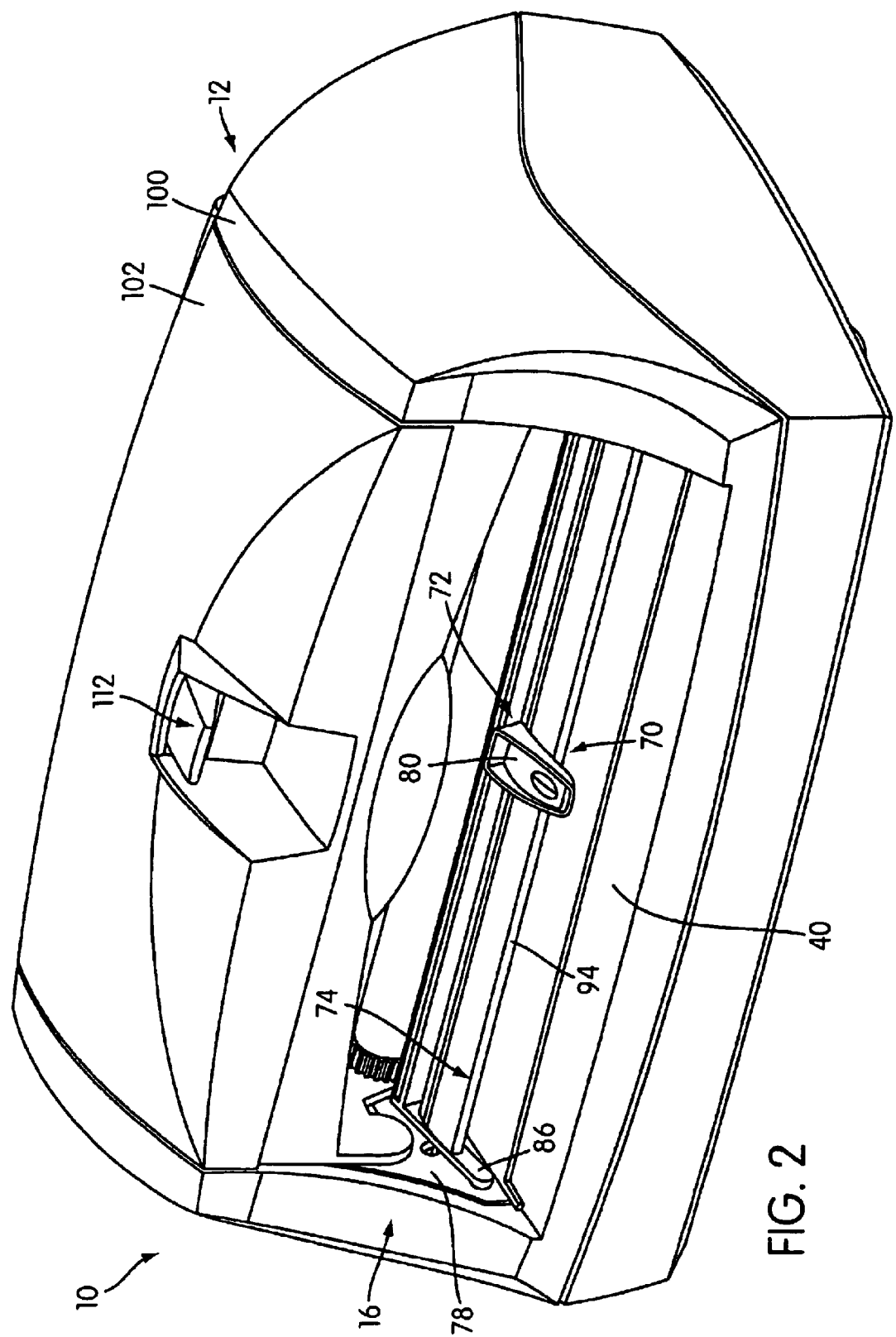
FIG. 2 is a perspective view of a discharge side of the master processing apparatus.

An example of a master processing apparatus, generally designated 10, constructed according to the principles of the present invention is shown in FIGS. 1–6. As explained below, the master processing apparatus 10 is constructed for use with a pair of removable feed rolls, each of which carries a supply of stock material that is wound around a central core. The stock materials can be, for example, a pair of transparent laminating films that are applied to opposing sides of a document, photograph or other master to be protected. In certain aspects of the invention, the stock materials may be designed for adhesive transfer with one of the stock materials being a release liner coated with a pressure-sensitive adhesive and the other stock material being an adhesive mask substrate (see U.S. Pat. Nos. 5,580, 417 and 5,584,962 and U.S. Appln. of Ensign, Jr., Ser. No. 09/564,587, filed May 5, 2000).

Other variations of master processing operations may be performed with the apparatus 10. For example, the stock materials may include a magnetized substrate and an aggressive or non-aggressive adhesive mask (see U.S. Appln. of Neuburger, Ser. No. 09/827,943, filed Apr. 9, 2001, and International Application PCT US01/12382). All the patents and patent applications mentioned hereinabove are hereby incorporated in their entirety into the present application by reference. Regardless of the specific type of application, the apparatus 10 is operable to unwind the supply of stock material on each roll and apply the stock materials to respective sides of the master. At least one of the stock materials has a layer of adhesive thereon which adheres the stock materials to one another and to the master therebetween.

The structure of the example master processing apparatus 10 can be best understood from FIGS. 1–4. The master processing apparatus 10 includes a frame 12 that has a feed opening 14 (see FIG. 1, for example) and an exit or discharge opening 16 (see FIG. 2, for example). The internal structure of the master processing apparatus 10 can be understood from the cross sections of FIGS. 2 and 3. The master processing apparatus 10 is constructed and arranged to removably mount the feed rolls 18, 20 (see FIG. 3, for example). Each roll 18, 20 has a supply of a wound stock material or substrate 21, 23, respectively. To better appreciate the discussion of the structure of the apparatus 10, its operation will be briefly considered first, with particular reference to FIG. 3.

Generally, a master 22 (shown in dashed lines and with exaggerated thickness in FIG. 3) is inserted into the feed opening 14, and then the master 22, along with unwound portions 24, 26 of the stock materials 21, 23 from the upper and lower rolls 18, 20, respectively, are passed through a master processing assembly 30. The master processing assembly 30 includes a pair of cooperating pressure applying structures in the form of first and second nip rollers 32, 34, respectively.

The nip rollers 32, 34 are rotatably mounted within the frame 12. An optional actuator, which may be in the form of a crank handle 36 as shown, is operatively connected with the nip rollers 32, 34. Alternatively, the actuator may be power-driven by a motor (such as an electric motor, for example). The master 22 is inserted into the master processing assembly 30 together with the stock materials 21, 23 unwound from their respective feed rolls 18, 20 and disposed on opposing sides of the master 22. At least one of the stock materials may be covered with a layer of a pressure-sensitive adhesive. As the master 22 and the two layers of unwound stock material 21, 23 pass between the nip rollers 32, 34, the nip rollers perform a master processing operation.

The nip rollers 32, 34 apply pressure to the stock materials (and to the master 22 when it is between the nip rollers 32, 34) during the master processing operation, which causes adhesive bonding of each adhesive layer provided by the stock materials which bonds the master 22 and the stock materials 24, 26 to form a final product 38 of the master 22 and stock materials 24, 26. The final product 38 is discharged out the discharge opening 16 by the driving action of the nip rollers 32, 34. The product 38 is supported at the discharge opening 16 by a substrate supporting surface 40. The substrate supporting surface 40 is configured to receive and support the processed master and stock materials discharged from the processing assembly in a substantially flat condition.

Figure 3:
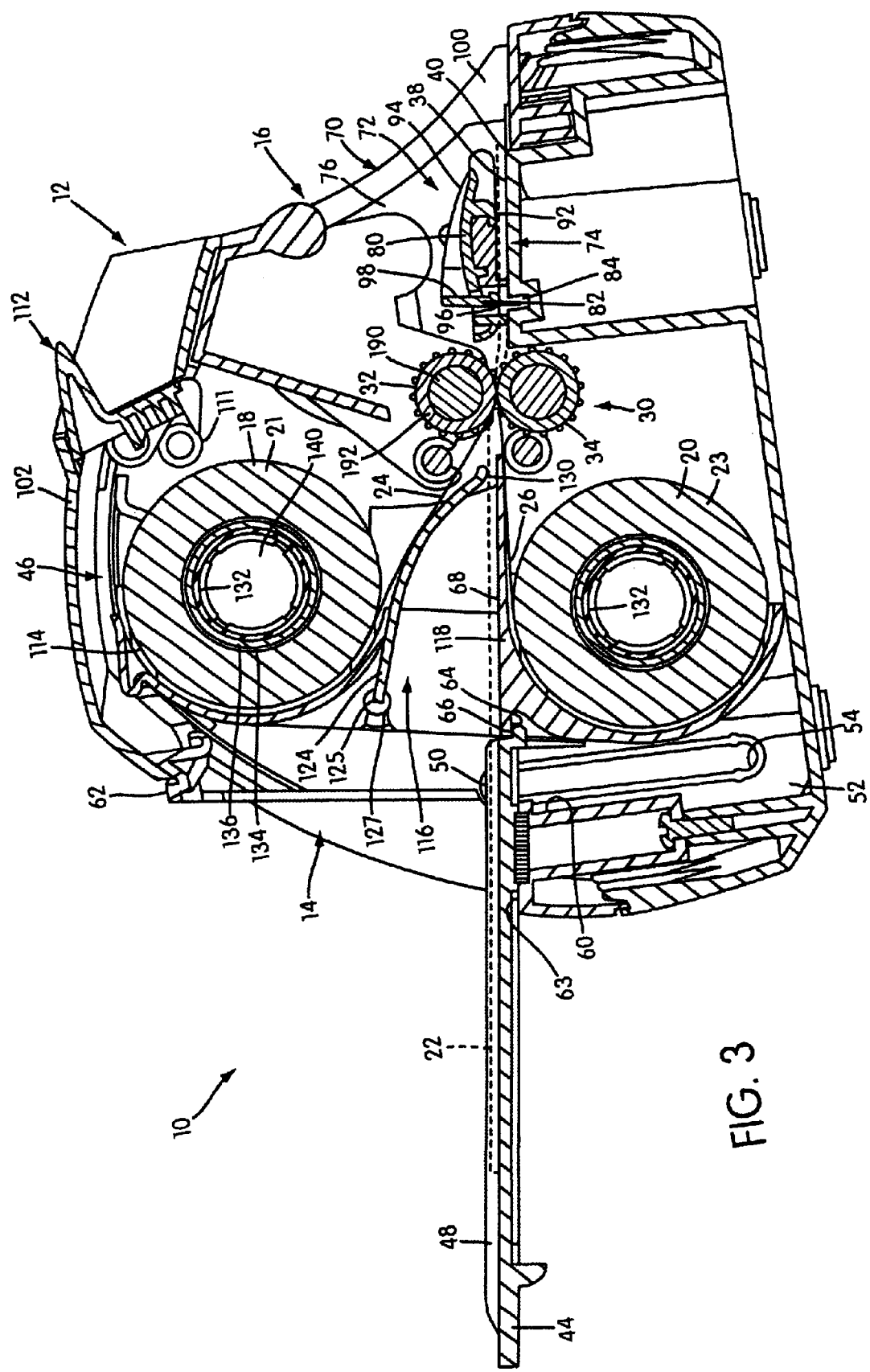
FIG. 3 is a cross-sectional view as taken along line 3—3 in FIG. 1.
Figure 4:
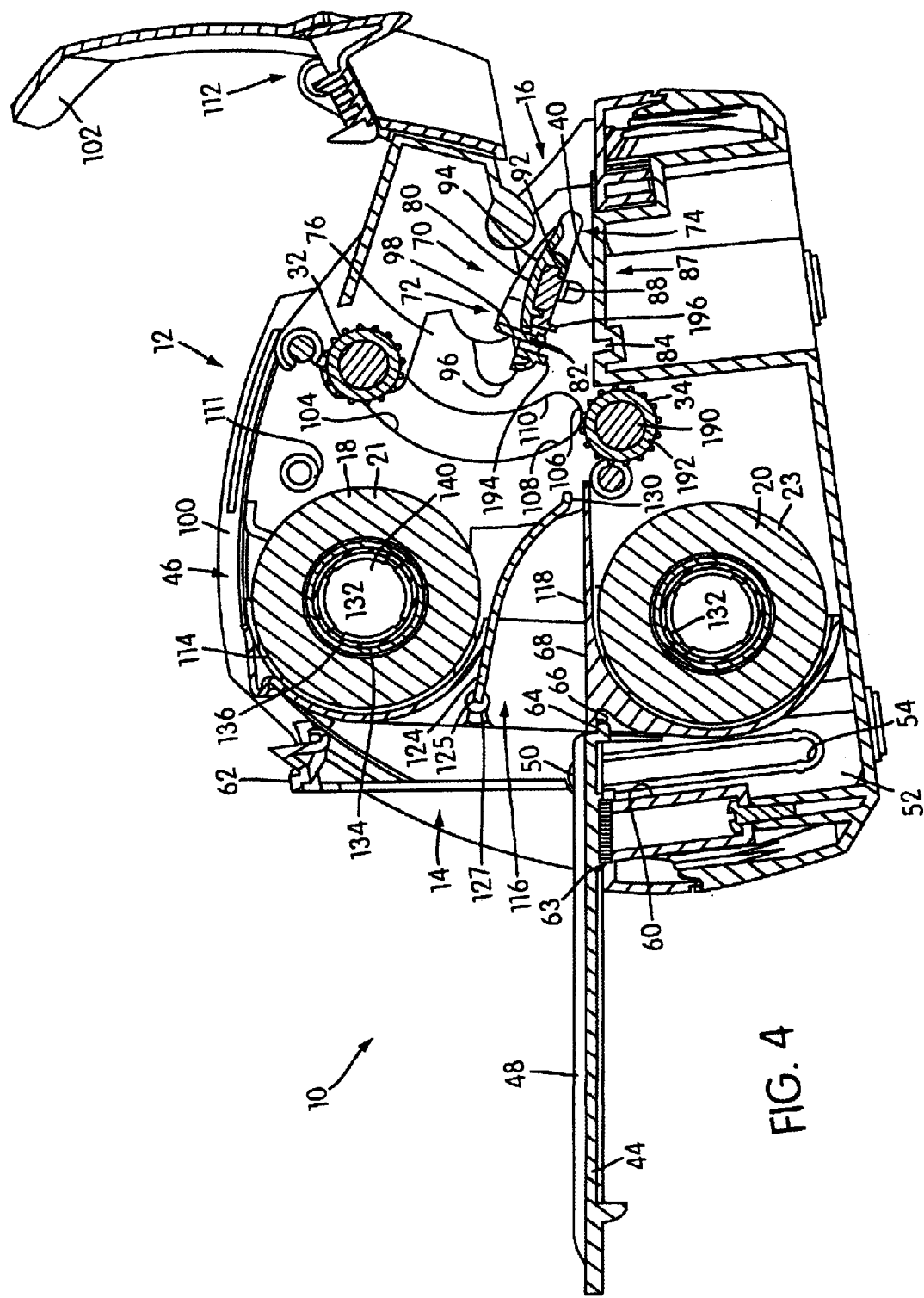
FIG. 4 is a cross-sectional view similar to FIG. 3 except showing a second frame portion thereof in an open position and a blade guide member thereof in an inoperative position.

The details of the structure of the master processing apparatus 10 can be best appreciated from the cross sectional views of FIGS. 3 and 4. The feed rolls 18,20 are mounted in a cartridge 46 that is removably mounted in the frame 12. The details of the construction of the removable cartridge 46 are considered below. A feed tray 44 having a substrate supporting surface 48 is movably mounted to the frame 12 on the feed side of the master processing assembly 30. Preferably the tray 44 and the frame 12 are molded plastic structures, although any suitable construction can be used.

Figure 5:
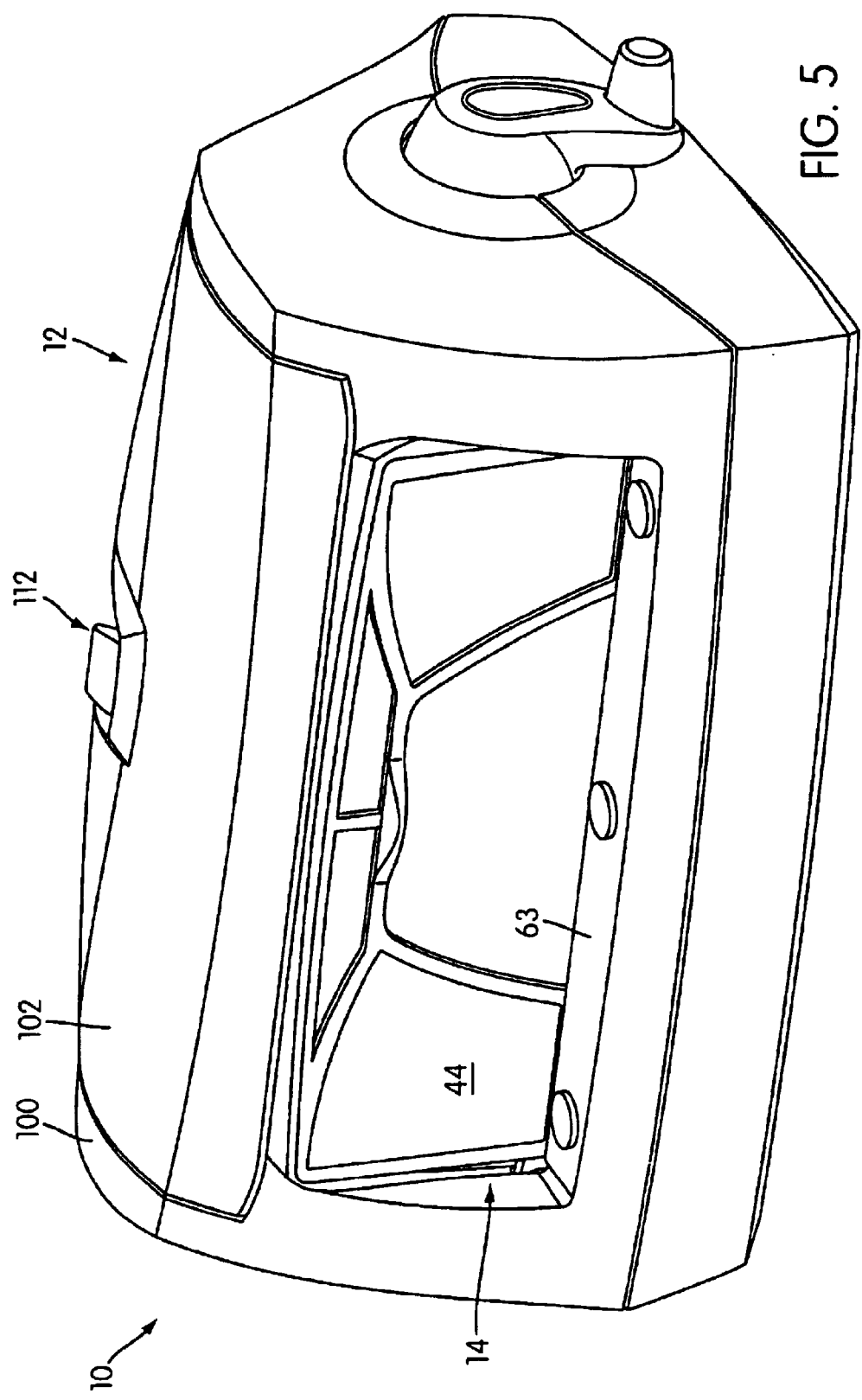
FIG. 5 is a perspective view similar to FIG. 1 except showing a feed tray thereof in its inoperative position.

Generally, the tray 44 is mounted on the frame 12 for selective movement between (a) an operative position (see FIG. 3, for example) and (b) an inoperative position (see FIG. 5). When the tray 44 is in its operative position, it extends outwardly from the master processing assembly 30 and the substrate supporting surface 48 on the tray 44 is positioned to support a master 22 in a substantially flat condition as the master 22 is being fed into the master processing assembly 30. When the tray 44 is in its inoperative position, it is positioned in covering relation to the feed opening 14 of the frame 12 to inhibit ingress of undesired objects into the master processing assembly 30 via the feed opening 14.

It is particularly advantageous to cover the feed opening 14 because the adhesive-carrying side of each stock material faces generally toward the feed opening 14. Debris entering the feed opening 14 could stick to the adhesive and ultimately become bonded between the processed layers of stock material or between a processed layer of stock material and the master 22, which would detract from the appearance of the final product 38. The movable mounting of the tray 44 into the storage position is also advantageous because it allows the apparatus 10 to be stored (in a package for shipping prior to sale or at a worksite after sale, for example) in less space. Specifically, moving the tray 44 into its inoperative position reduces the "footprint" of the apparatus 10.

The details of the mounting of the tray 44 can be appreciated from FIG. 3. The feed tray 44 has a pair of pins 50 (only one of which is visible in FIG. 3) extending outwardly from opposite sides thereof. The frame 12 defines an opposing pair of walls 52, each wall 52 of the pair being disposed on a respective side of the opening 14. (Because these opposing walls are preferably of mirror image construction, with the exception of an opening for accommodating an actuator, and because only one wall is visible in the cross-sectional views of FIGS. 3 and 4, both walls will be referred to by the same reference number, 52). A tray guide track 54 is formed on each wall 52 so that there is a guide track on each side of the opening 14. Each pin 50 is movably disposed in a respective tray guide track 54.

When the tray 44 is in its inoperative position (FIG. 5) in covering relation to the opening 14, each pin 50 is proximate the bottom of the associated guide track 54 and the tray 44 is held in a generally upright position in covering relation to the opening 14 by several wall surfaces on the frame 12, including, for example, generally vertical wall surfaces 60 and 62 (see FIG. 3). Specifically, these surfaces 60, 62 prevent the tray 44 from pivoting relative to the frame 10. To move the tray 44 from its inoperative position to its operative position, the tray 44 is first moved generally upwardly with the pins 50 riding along their associated tracks 54 until each pin 50 is proximate the top of its associated guide track 54. The tray 44 is then pivoted outwardly and downwardly until it is in its operative position (FIG. 3, for example). The tray 44 is prevented from pivoting beyond its operative position by engagement between stop surfaces 64, 66 on the tray and frame 12, respectively, and by a tray support surface 63 provided by the frame 12.

It can be appreciated from FIG. 3 that, when the tray 44 is in its operative position, the substrate support surfaces 40, 48 are generally coplanar (along with a substrate support surface 68 provided by a portion of the cartridge 46 considered below) and cooperate to define a support path that slopes slightly downwardly relative to horizontal in a direction from the feed opening 14 to the discharge opening 16. This construction facilitates insertion of a master into the opening 14 and its subsequent passage into and through the master processing assembly 30.

A cutting assembly 70 (best seen in the cross sections of FIGS. 3 and 4 and in FIG. 2) is disposed on the discharge side 16 of the master processing assembly 30 and is operable to sever a final product 38 containing a master 22 from the continuous strips of stock material. The cutting assembly 70 includes a blade assembly 72 and a guide member 74. The guide member 74 is movably mounted between opposing walls 76, 78 of the frame structure 12 and extends transversely across the discharge opening 16 generally above the substrate support surface 40. The blade assembly 72 includes a blade carriage 80 and a pointed, double sided blade 82. The blade 82 of the blade assembly 72 is mounted on the guide member 74 for guided transverse cutting movement therealong. Specifically, the blade 82 is mounted to the blade carriage 80 and the blade carriage is slidably mounted on the guide member 74.

The guide member 74 is movably mounted to the frame 12 for selective manual movement between (a) an inoperative position (see FIG. 4, for example) in which the blade 82 is spaced above the substrate supporting surface 40 to prevent the blade from cutting through the processed master 22 and stock materials 21, 23 in the event of accidental lateral movement thereof and (b) an operative position (see FIG. 3, for example) in which a portion of the blade 82 extends downwardly below the substrate supporting surface 40 (and into a laterally extending blade receiving slot 84 formed in the surface 40 of the frame 12) so that the downward extent of the blade portion 82 of the blade assembly 72 enables the blade 82 to cut through an entire thickness of the processed master and stock materials 38 during transverse cutting movement of the blade assembly 72 with respect to the guide member 74.

The guide member 74 has a pair of mounting arms 86 integrally formed on opposing ends thereof. The mounting arms 86 are pivotally connected to the frame 12 to enable the guide member 74 to pivot between its operative and inoperative positions. The guide member 74 also includes a cutter guide which guides the movement of the blade 82 into the slot 84 as the guide member 74 moves from its inoperative position into its operative position. The cutter guide in the example embodiment of the apparatus 10 is provided in the form of a pair of projections (not visible) which extend laterally outwardly from the mounting arms 86 and are received in recesses formed in the walls of the frame 12. Specifically, each projection is integrally formed on a central portion of a respective mounting arm 86 and each projection is slidably received within an arcuate blade guide track 90 formed in the respective wall portions 76, 78 of the frame 12. The arcuate shape of the tracks 90 guides the projections which, in turn, guides the pivotal movement of the guide member 74.

Each projection is biasingly engaged by biasing structure in the form of a spring 88 (see FIG. 4, for example) mounted within the frame 12 that biases the projections upwardly to the upper ends of their respective blade guide tracks 90, thereby biasing the guide member 74 upwardly into its inoperative position so that the blade 82 is spaced above the final product 38 emerging from the discharge opening 16. This upward biasing of the guide member 74 assures that the final product 38 is not accidentally cut or scratched by an operator's inadvertent lateral movement of the blade 82 and the blade carriage 80 during a master processing operation.

Because the guide member 74 is pivotally mounted to the frame 12, the blade 82 travels along a generally arcuate path between its inoperative and operative positions. The blade 82 is positioned immediately adjacent the discharge side of the master processing assembly 30 when it is in its operative position and the guide member 74 is movably mounted to the frame 12 such that the blade 82 moves both toward the master processing assembly 30 and downwardly as the guide member 74 is moved from its inoperative position to its operative position. It can be appreciated from FIGS. 3 and 4 that when the cutting assembly 70 is in its inoperative position, the guide member 74 and the blade carriage 80 are disposed such that the blade 82 is angled into the discharge opening 16. This prevents the operator from accidentally being cut as a result of contact with the blade 82.

The guide member 74 and the blade carriage 80 are each of one piece, molded plastic construction and each is molded to allow the two pieces 74, 80 to be snap-fit or press fit together for sliding movement of the blade carriage 80 with respect to the guide member 74. Specifically, as best appreciated from FIG. 4, a lower wall portion 92 of the blade carriage 80 hookingly engages an outer edge portion 94 of the guide member 74 and an inner end portion 96 of the blade carriage 80 is received within an outwardly facing C-shaped recess 98 formed in the guide member 74. This construction allows the blade carriage 80 to be fit onto the guide member 74 and allows easy sliding movement therebetween. This engagement between the blade carriage 80 and the guide member 74 keeps the blade 82 properly aligned relative to the final product 38 during a cutting operation so that its cutting edge is directed transversely (i.e., perpendicularly) to the longitudinal extent of the final product 38 being cut.

As best appreciated from a comparison of FIGS. 3 and 4, the frame 12 includes first and second frame portions 100, 102, respectively, which are movably connected for movement relative to one another between closed (FIG. 3) and open (FIG. 4) positions. Preferably each portion 100, 102 is of shell-like, molded plastic construction, although any suitable materials can be used. Frame portion 102 is pivotally mounted to frame portion 100 by a pair of integral projections (not shown) formed on opposite sides of frame portion 102 that are received within a pair of openings (not shown) formed within opposing wall portions of frame portion 102.

It can also be appreciated from a comparison of FIGS. 3 and 4 that the pair of cooperating pressure applying nip rollers 32, 34 are constructed and arranged to be positioned adjacent one another in cooperating pressure applying relation to one another (FIG. 3) and to be moved apart to an open access position (FIG. 4). Specifically, one of the pressure applying structures (that is, the lower nip roller 34) is mounted to the first frame portion 100 and the other pressure applying structure (that is, the upper nip roller 32) is mounted to the second frame portion 102 such that (a) movement of the frame portions 100, 102 into their open positions moves the pressure applying structures 32, 34 apart from one another into an open access position to allow the stock materials to be easily positioned therebetween and (b) movement of the frame portions 100, 102 into their closed positions moves the pressure applying structures 32, 34 into engagement with one another and into pressure applying engagement with the portion of the stock materials positioned therebetween.

When the second frame portion 102 is in its open position, this also allows an old cartridge 46 to be removed when its supply of stock materials is used up and a new cartridge having a fresh supply of stock materials to be placed in the apparatus 10. After a new supply of stock materials is placed in the apparatus 10, the end portions of the stock materials 21, 23 on a respective feed rolls 18, 20 are pulled out from the rolls and positioned between the nip rollers 32, 34. The two frame portions 100, 102 are then moved back into their closed positions.

Thus, moving the nip rollers apart when the frame portions 100, 102 are opened to replace a cartridge 46 allows the operator to easily thread the new stock materials between rollers 32, 34. It is advantageous, however, for the nip rollers 32, 34 to be accurately aligned with one another when they are moved back into pressure applying relation with one another. The frame 12 includes alignment structure constructed and arranged to guide the relative movement of the pressure applying structures 32, 34 from their open access position back into their engaged position and to hold them in uniform pressure applying relation to one another to apply uniform pressure to the stock materials therebetween.

Specifically, an arcuate nip roller guide track 104 (only one of which is shown in FIG. 4) is formed in each opposing wall 76, 78 of the first frame portion 100 and a nip roller guide projection (neither of which is visible in the figures) is formed on (or carried by) each side of the second frame portion 102. Each of the nip roller guide projections is movably received within an associated guide track 104. Preferably, the nip roller guide projections are coaxial with the axis of rotation of the upper nip roller 32 (although this is not required and other constructions are possible). As the second frame portion 102 is moved to its closed position, the nip roller guide tracks 104 guide the nip roller guide projections to, in turn, guide the upper nip roller 32 into its properly aligned position parallel to and in nipped engagement with the lower nip roller 34.

Each nip roller guide projection is biased into engagement with a lower wall portion and with side wall portions 106, 108, 110, respectively, of the associated guide track 104 by the latching engagement between a latch assembly 112 on the second frame portion 102 and latch structure 111 on the first frame portion 100. The latch assembly 112 and the latch structure 111 comprise a latch mechanism. This latching engagement holds the frame portions 100, 102 in their closed positions and biases the roller aligning engagement between the wall portions 106, 108, 110 of the roller guide track 104 and the associated projection on each side of the second frame portion 102. This arrangement fixes (i.e., maintains) the position of the upper nip roller 32 and keeps the axes of rotation of the nip rollers 32, 34 parallel.

In certain aspects of the invention, the master processing assembly could involve heating elements suitable for softening a heat-sensitive adhesive prior to applying pressure to the same.

The Replaceable Cartridge

Figure 6:
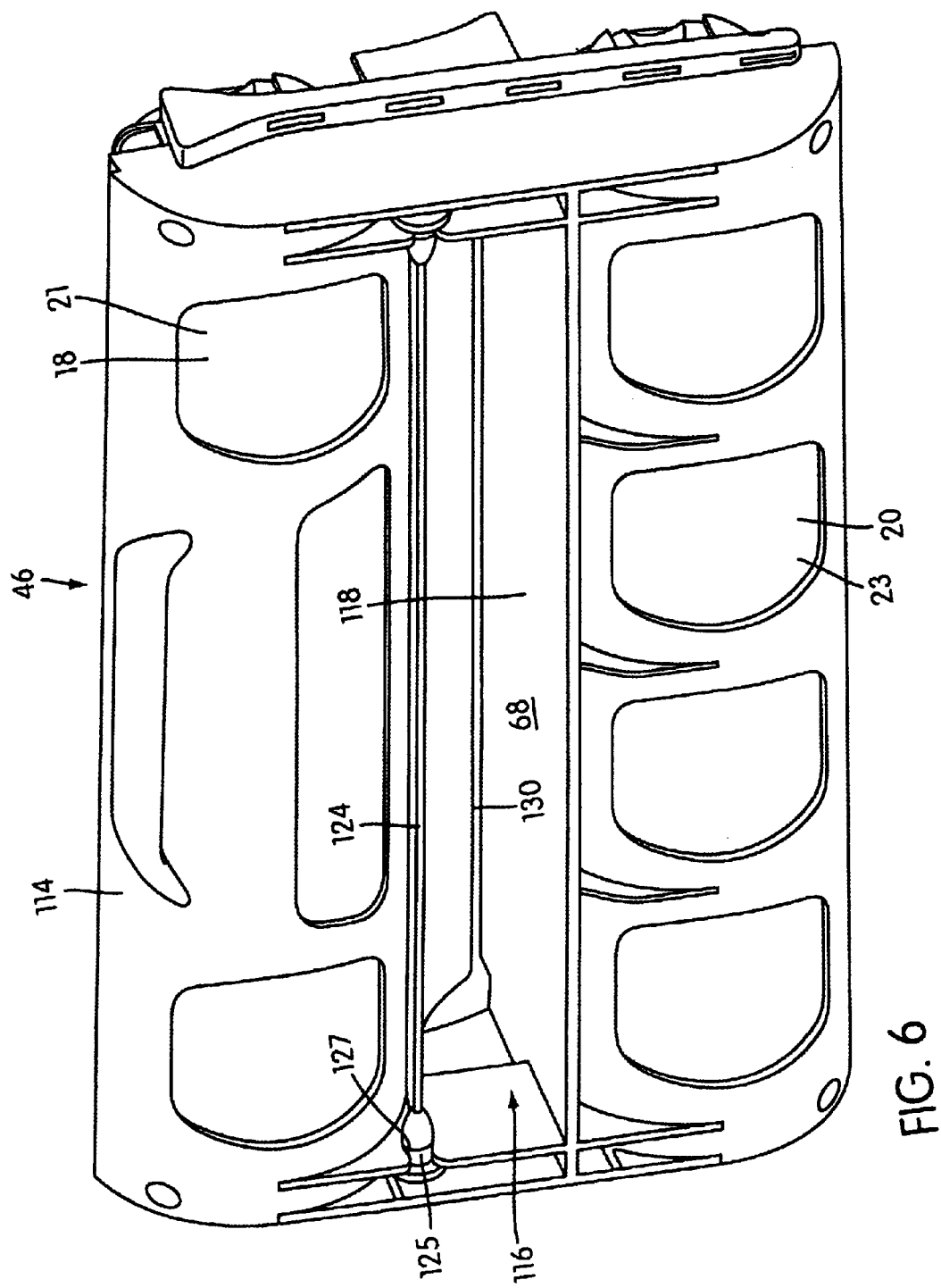
FIG. 6 is a perspective view of the feed side of a removable cartridge constructed according to the principles of the present invention.
Figure 7:
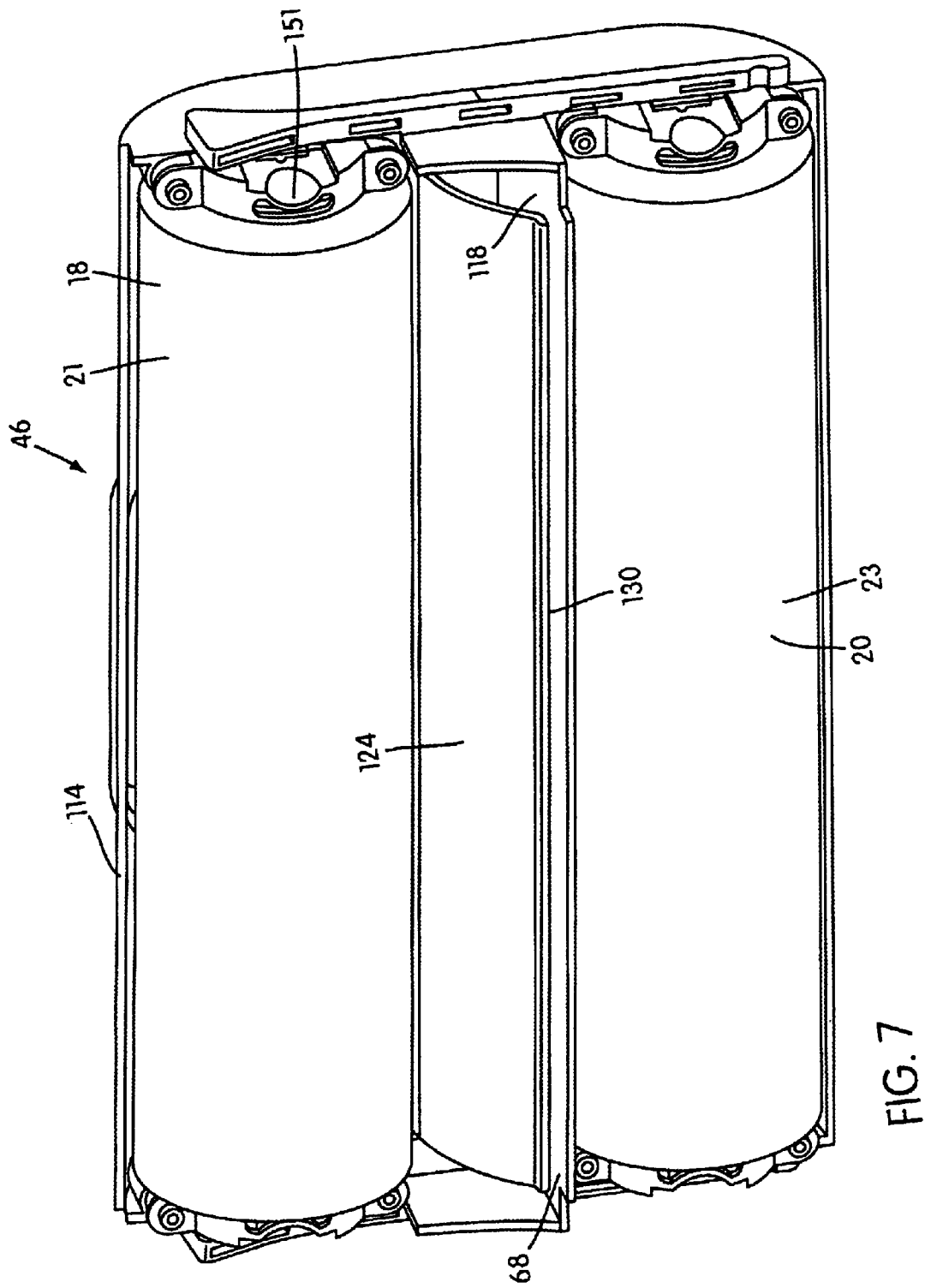
FIG. 7 is a perspective view of a discharge side of the cartridge.

Preferably, the replaceable feed rolls 18, 20 are mounted within a cartridge to facilitate easy removal and replacement of the feed rolls. An example of a preferred replaceable cartridge 46 for use in the apparatus 10 is shown in FIGS. 6–9. FIGS. 6 and 7 show the front (i.e., the side that faces the feed opening of the frame 12) and back (i.e., the side that faces the discharge opening of the frame 12), respectively, of cartridge 46. The cartridge 46 includes a cartridge body structure 114 (that is preferably made of a suitable molded plastic, although any appropriate material can be used in the construction) that is constructed and arranged to be removably mounted to the apparatus frame 12 and a pair of feed rolls 18, 20 rotatably mounted in the cartridge body structure 114 in a manner described below.

The feed rolls 18, 20, each carry a supply of the stock materials 21, 23 and each feed rolls 18, 20 is mounted to the cartridge body structure 114 to enable the stock materials 21, 23 to be unwound from the respective feed rolls and placed between the nip rollers 32, 34. The cartridge body structure 114 and the feed rolls 18, 20 are constructed and arranged such that, when the cartridge body structure 114 is removably mounted to the apparatus frame 12, a master 22 can be inserted into an front opening 116 of the cartridge 46 and pass therethrough into the master processing assembly 30 of the apparatus 10 with the first and second stock materials 21, 23 from the respective feed rolls 18, 20 disposed on opposing sides of the master 22.

The cartridge 46 includes a substrate supporting member 118 which extends between opposing sidewalls 120, 122 of the cartridge 46. The upper surface of the supporting member 118 provides a generally planar substrate supporting surface 68. The substrate supporting member 118 is positioned with respect to the cartridge body structure 114 such that, when the cartridge body structure is removably mounted to the apparatus frame 12, the substrate supporting surface 68 is positioned on the feed side of the master processing assembly 30 and the substrate supporting surface 68 is configured to support the master 22 in substantially flat condition while the master 22 is being fed into the master processing assembly 30 (see FIG. 3, for example). The substrate supporting surface 68 is generally coplanar with and immediately adjacent to the substrate supporting surface 48 of the feed tray 44 so that together these surfaces 48, 68 continuously support the master as the master passes from the feed tray 44 toward and into the master processing assembly 30.

The cartridge 46 also includes a master engaging structure 124 extending forwardly into the cartridge opening 116. The master engaging structure 124 is preferably of molded plastic construction and has integral pin structures 125 extending outwardly from each side thereof. Each pin structure 125 can be snap-fit into pivotal engagement with the cartridge body structure 114 by pressing each pin 125 into a respective receptacle 127 on the cartridge body structure 114. Thus the master engaging structure 124 is pivotally mounted between the opposing side walls 120, 122 of the cartridge 46 and curves generally arcuately downwardly toward the master processing assembly 30. A master engaging end 128 of the master engaging structure 124 extends generally transversely across the substrate supporting surface 68 and provides a master engaging surface 130 that engages the master 22 while the master is supported on the substrate supporting surface 68.

The master engaging surface 130 of the master engaging structure 124 applies a frictional resistance to the advancement of the master 22 in a feeding direction to thereby tension the master to prevent the same from wrinkling, for example, as it goes into the master processing assembly 30. The master engaging structure 124 in the illustrative embodiment (see FIGS. 3 and 4, for example) provides this frictional resistance because weight of the master engaging structure 124 (that is, the end opposite the rearward end that is pivotally connected to the cartridge) is supported by the master engaging surface 130. Thus, the gravitational force of on the master engaging structure 124 causes the surface 130 to exert sufficient downward force on the master 22 to tension the same. This use of the force of gravity to bias the master engaging structure 124 into frictional engagement with the master 22 simplifies the construction of the apparatus 10. This tensioning arrangement does not require a separate mechanical biasing structure (such as a spring, for example) applying a downward force on the master engaging structure 124. An additional benefit to the gravitational engagement is that the master engaging surface 130 exerts an essentially constant downward force on the master 22, regardless of the thickness of the master 22. If a spring were used to tension the master, for example, the spring force may vary depending on the thickness of the master because a change in thickness may result in a change in the amount the spring is compressed. This constant force and the curved shape of the master engaging structure 124 also facilitates the insertion of a master. There is no need for the operator to manually lift the master engaging structure 124 when a new master is inserted in the apparatus 10 for processing, regardless of the thickness or texture of the master 22. The master engaging structure 124 is thus advantageous because it is easy to use and does not need to be manually lifted by the operator.

The master engaging structure may also provide the additional, but not necessary, benefit of wiping any particles off the surface of the master 22. When this additional optional cleaning function is performed by the master engaging structure 124, a suitable, non-scratching material such as a suitable cloth material may be provided on the master engaging surface 130 to, in effect, wipe the master as it moves toward the master processing assembly 30.

Figure 8:
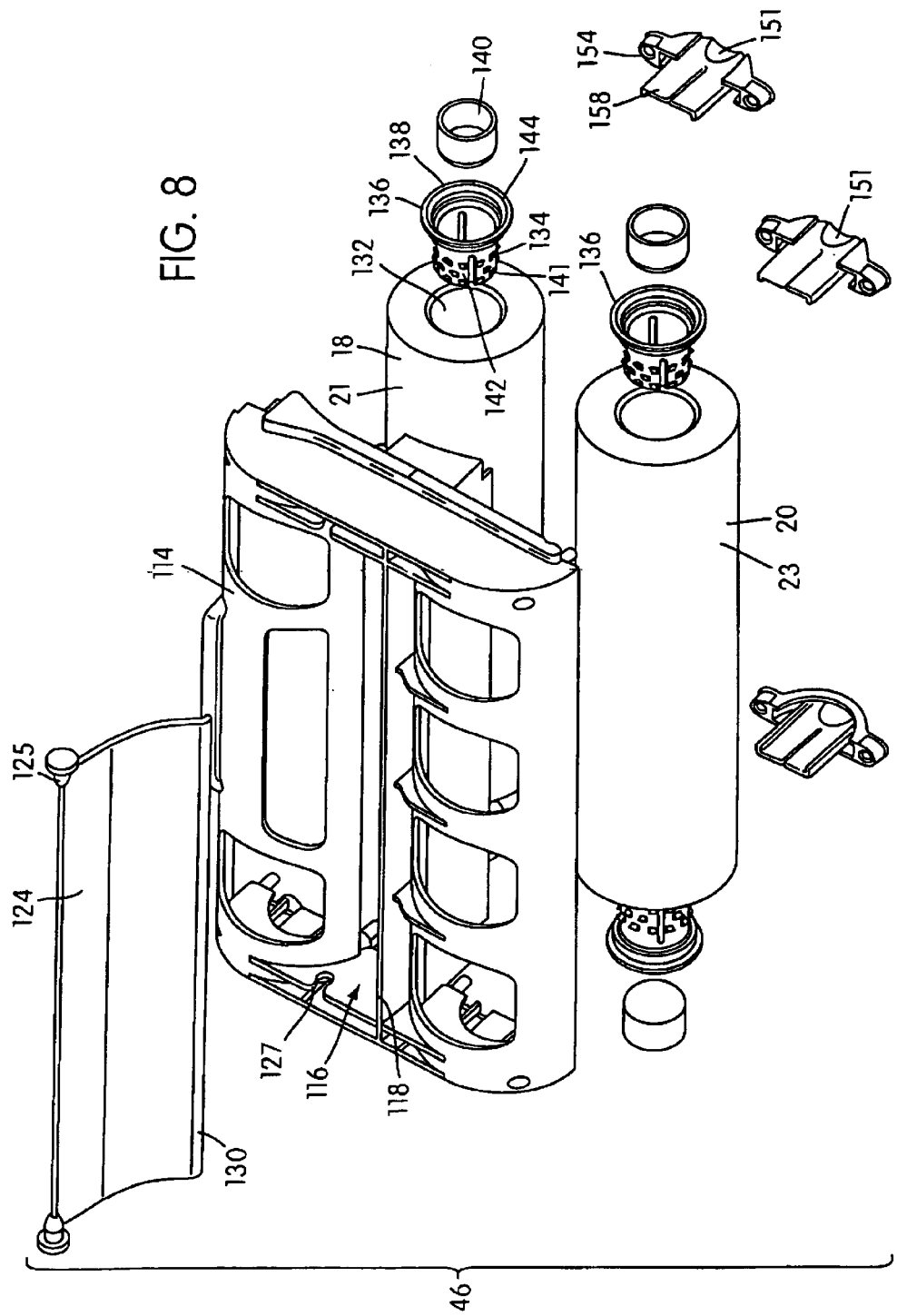
FIG. 8 is an exploded view of the cartridge generally from its feed side.
Figure 9:
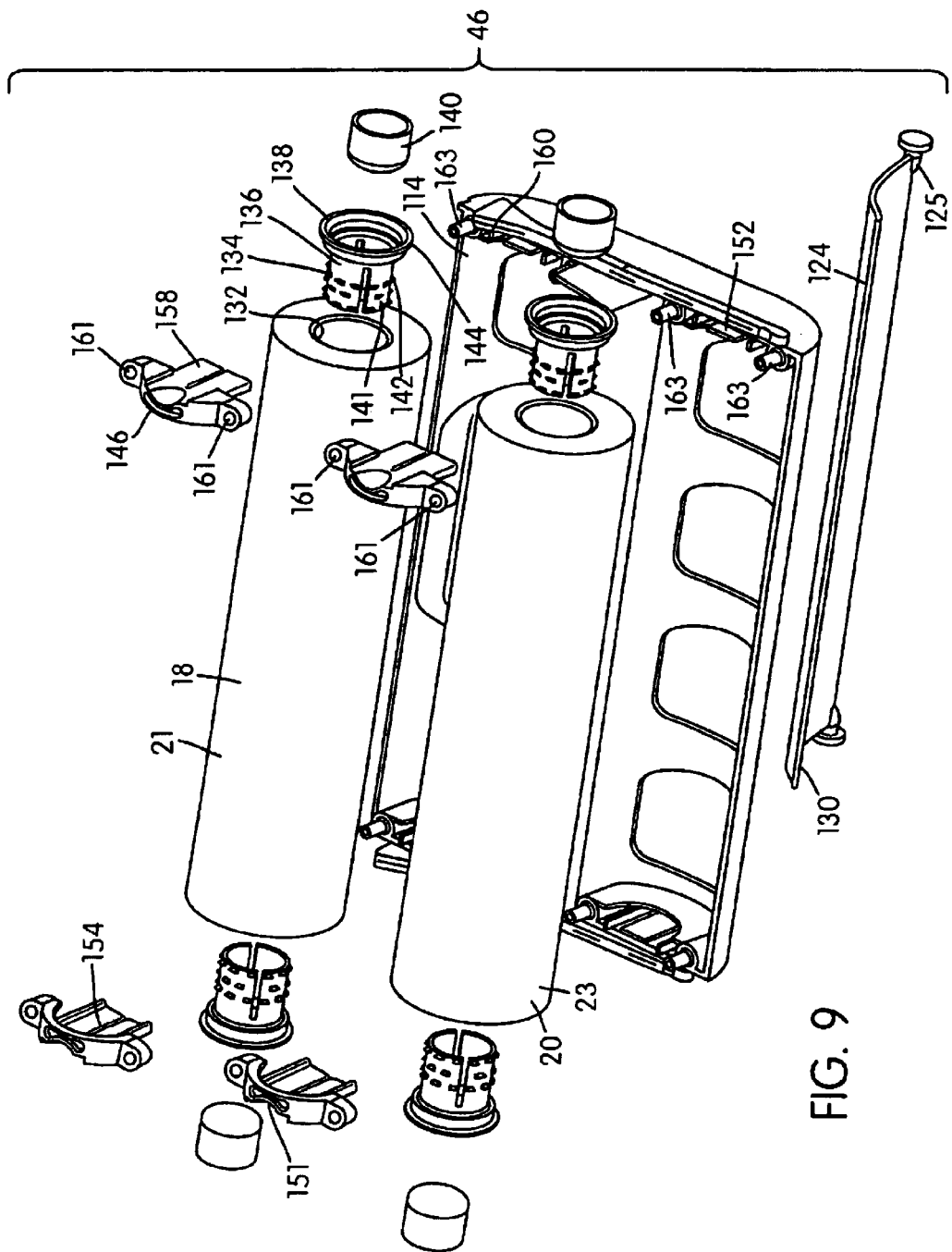
FIG. 9 is an exploded view of the cartridge generally from its discharge side.

The details of the construction of the cartridge 46 can best be understood from the exploded views of FIGS. 8 and 9. Each roll of stock material (or substrate) 18, 20 is comprised of a long, continuous strip of stock material wound around a central tubular core 132. Typically the core 132 is made of heavy cardboard. An end cap 134 is mounted in each end of the core 132 and the end caps 134 are used to rotatably mount each roll in the cartridge body structure 114.

Each end cap 134 is preferably an integral molded plastic structure that includes a tubular core securing portion 136 and a mounting portion 138 connected to the core securing portion. The core securing portion 136 is normally in a relaxed, unexpanded condition to enable insertion of the securing portion 136 into an end of a core 132. After the securing portion has been inserted into the end of a core, an expansion member 140 is inserted into the core securing portion 136. The size and configuration of the expansion member 140 causes or tends to cause the securing portion 136 to expand generally radially into a force-fit relation with the interior surface of the core 132. This force-fit relation secures the end cap 134 to the core 132.

Figure 10:
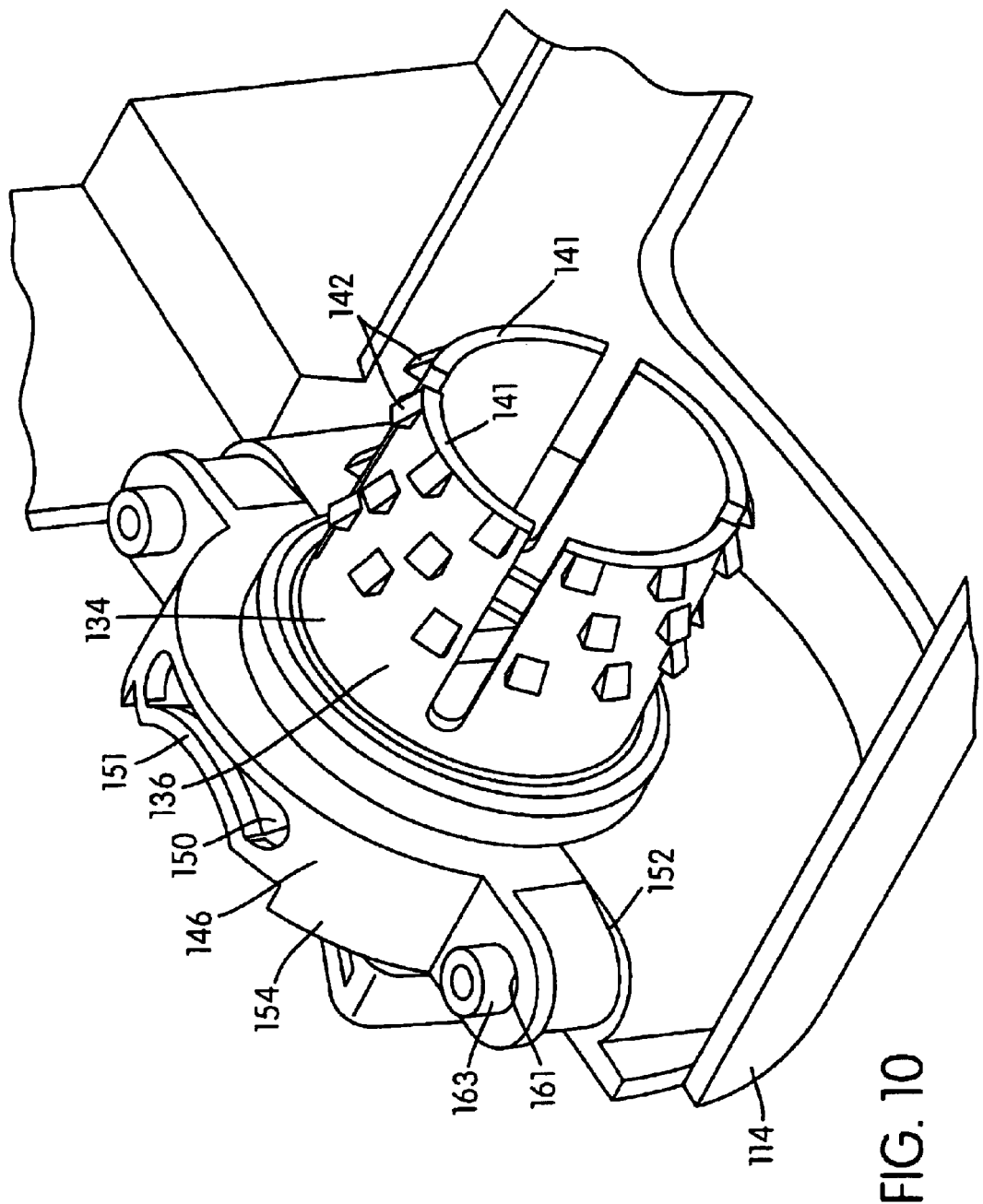
FIG. 10 is a close-up perspective view of a feed roll end cap mounted to the cartridge and isolated from its respective feed roll.
Figure 11:
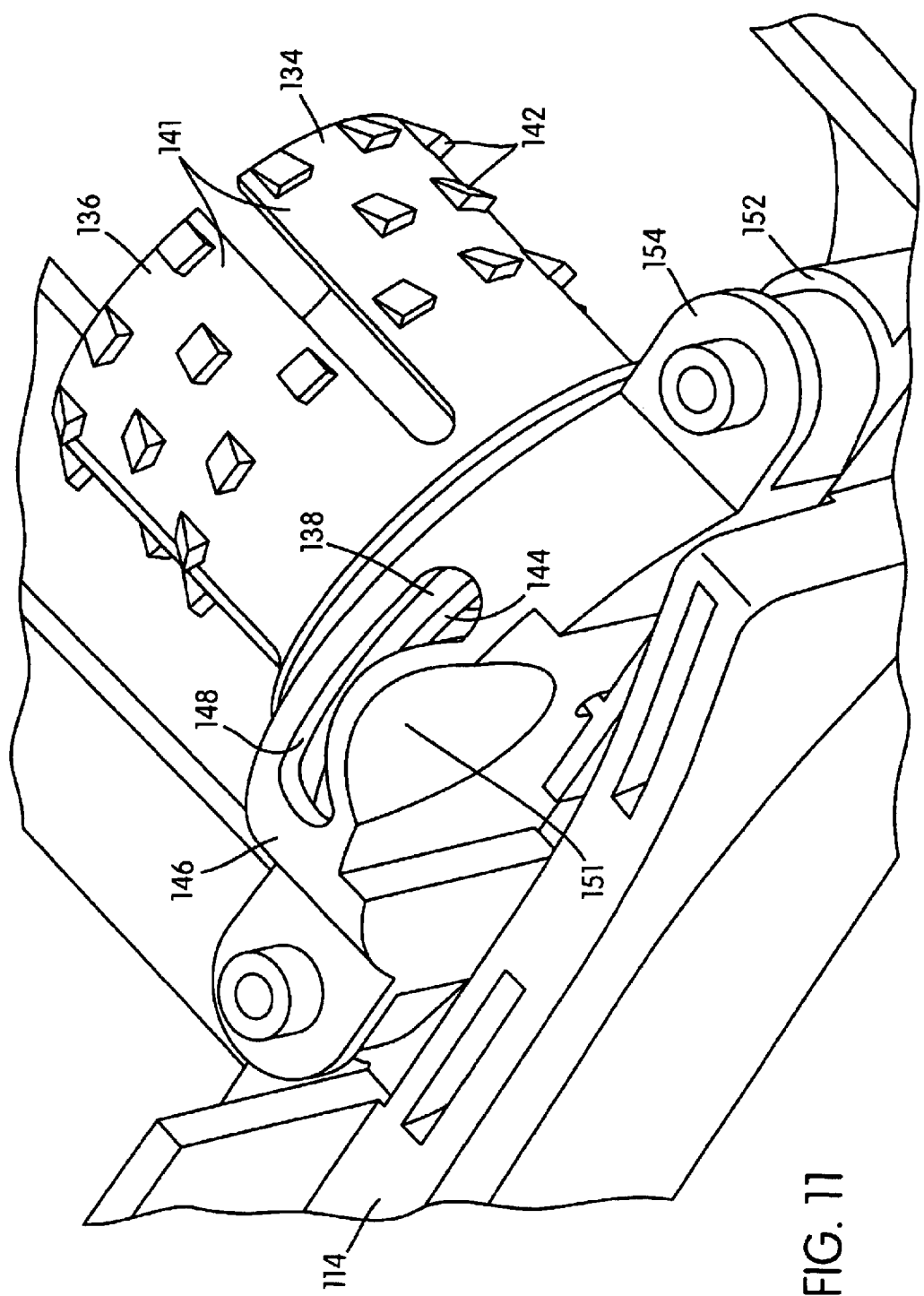
FIG. 11 is a close-up perspective view of the feed roll end cap of FIG. 10, but taken from another angle.

It can be appreciated from FIGS. 9–11, for example, that the securing portion 136 of each end cap 134 is in the form of a cylinder split into quarter sections to define a plurality of resilient tabs 141. The exterior of each tab 141 is covered with a plurality of core gripping teeth 142. The split cylinder construction allows tabs 141 to flex slightly radially inwardly to facilitate insertion of the end cap 134 into the free end of a tubular core 132. Each expansion member 140 is in the form of a plug which, when inserted into the interior of the securing portion 136 of the end cap 134, forces the tabs 141 of the securing portion 136 to move radially outwardly and causes the teeth 142 to become embedded in the cardboard of the core 132. It can be appreciated that this method of attaching an end cap 134 to each end of the core 132 is purely mechanical and does not require the use of glue and is therefore easier (no glue has to be applied) and faster (the manufacturing process does not have to pause to allow the glue to dry) than processes which use glue.

The manner in which the end caps 134 are rotatably mounted to the cartridge body structure 114 can be best appreciated from FIGS. 9–11. FIGS. 10 and 11 show two views of an end cap 134 in isolation (that is, without an expansion member 140 and without the core 132/substrate 21) to illustrate the rotatable mounting of the end cap to the cartridge body structure 114.

Each end cap 134 provides an annular flange 144 mounted in fixed relation to the end of the core 132 of each feed roll 18, 20. The cartridge 46 rotatably supports each end cap of the feed rolls 18, 20 and provides a pre-tension brake 146 for each end cap 134. Each brake 146 includes a pair of brake surfaces 148, 150 (see FIGS. 10 and 11, for example) which frictionally engage opposing sides of each flange 144 of the end cap. When the cartridge 46 is removably mounted on the apparatus frame 12 and the stock material 21 is being unwound from the core 132, the core 132 with the flange 144 fixed thereon rotates relative to the cartridge body structure 114 and the brakes 146 so that braking friction is created between the flange and the braking surfaces 148, 150 of the pre-tensioning brake. In other words, the flanges 144 on the end cap 134 and the associated brakes 146 on the cartridge body structure 114 cooperate to provide frictional resistance to the rotational movement of the associated feed roll when the stock material is being unwound by the action of the nip rollers 32, 34.

This frictional engagement prevents the feed roll from rotating at a faster rate than is required to supply stock material to the nip rollers 32, 34. This keeps the unwound portion 24 or 26 of stock material 21 or 23 between the feed roll 18 or 20 and the nip rollers taut, which prevents the stock material from wrinkling on the master 22 or adhering to itself prior to being fed to the nip rollers. Preferably this pre-tensioning brake arrangement (between the end cap 134 and the brake 146) is provided at each end of each feed roll 18, 20, but one brake at each end of each feed roll can also be used, with the other opposite end of each feed roll being free wheeling (that is, having no frictional engagement that would tend to slow or dampen roller rotation).

The specific construction of the brake arrangement used in the example embodiment of the apparatus 10 can best be appreciated from the exploded view of FIG. 9. Each brake 146 includes a holding structure 152 integrally formed with the cartridge body structure 114 and a holding member 154 (which forms part of the cartridge body structure 114 when it is secured thereto) that has a wall portion 158 that is received within a slot 160 within the holding structure 152. The holding member 154 includes a pair of openings 161 that are mounted on posts 163 integrally formed on the cartridge body structure. The posts 163 may be secured within the openings 161 by snap-fitting, heat staking, by welding therein or by any other method to hold the annular flange 144 rotatably therebetween. The holding structure 152 provides bearing structure the functions to rotatably support an end cap of the core mounted therein. The holding member 154 provides the braking surfaces which provide a braking force to the end cap.

The interior of the holding member 154 provides the braking surfaces 148, 150 which are opposed to one another and frictionally engage the opposing major surfaces of the flange 144 to dampen or moderate rotational movement of the associated feed roll 18 or 20 to prevent wrinkling of the substrate during a master processing operation. The braking force is created because the flange 144 is received in an interference fit relation between the braking surfaces 148, 150. The surface 150 is arcuate and is formed on an integral arcuate structure 151 that may be constructed (of a molded plastic, for example) to resiliently flex of deform slightly when the end cap is placed between the surfaces 148, 150. The interference fit provides the braking friction when the flange 144 moves relative to the surfaces 148, 150. Alternatively, one or both of the braking surfaces 148, 150 could be provided on a flexible or movable member that is biased into engagement with the flange 144 so that the braking friction is created in part by the biasing force. An example of this type of arrangement is shown and described below.

The brake 146 can be used with feed rolls that are individually mounted to the apparatus frame without the use of a cartridge, as disclosed in the above-incorporated '962 patent. In this case, the brake 146 at each end of the feed roll (or at one end of each feed roll in the instance in which only one brake is used per feed roll) is incorporated in feed roll mounting structure carried on the ends of the feed rolls. This feed roll mounting structure removably mounts to the apparatus frame to support its associated feed roll. The feed roll mounting structure cooperates with the frame so that both the feed roll mounting structure and its pre-tensioning brake 146 remain stationary as the core rotates during unwinding of the stock material. The brake 146 for each individual feed roll will provide braking surfaces similar to the braking surfaces 148 and 150 in the cartridge 46 to provide frictional resistance to the flange. Alternatively, the brake(s) 146 could be incorporated or integrated into the apparatus frame and the flanges on the feed rolls removably mount thereto in the same manner.

In a broad sense, the cartridge 46 serves to removably mount the feed roll 18, 20 to the apparatus frame 12. Thus, the cartridge 46 may be referred to as a feed roll mounting structure, which is intended to encompass any structural arrangement suitable for mounting and supporting one or more feed rolls on an apparatus frame.

It is within the scope of the invention to sell the feed rolls 18,20 with the end caps 134 as replacement feed rolls. This would be done without selling the cartridge body. The end user would purchase these replacement feed rolls 18,20 and mount them by the flanges 144 to the cartridge body in the manner discussed above to replace spent feed rolls. The advantage of this is that the cost of the cartridge body is eliminated for the replacement supplies. Also, because the user does not have to replace the cartridge body, it does not have to be discarded, which is more environmentally friendly.

Figure 12:
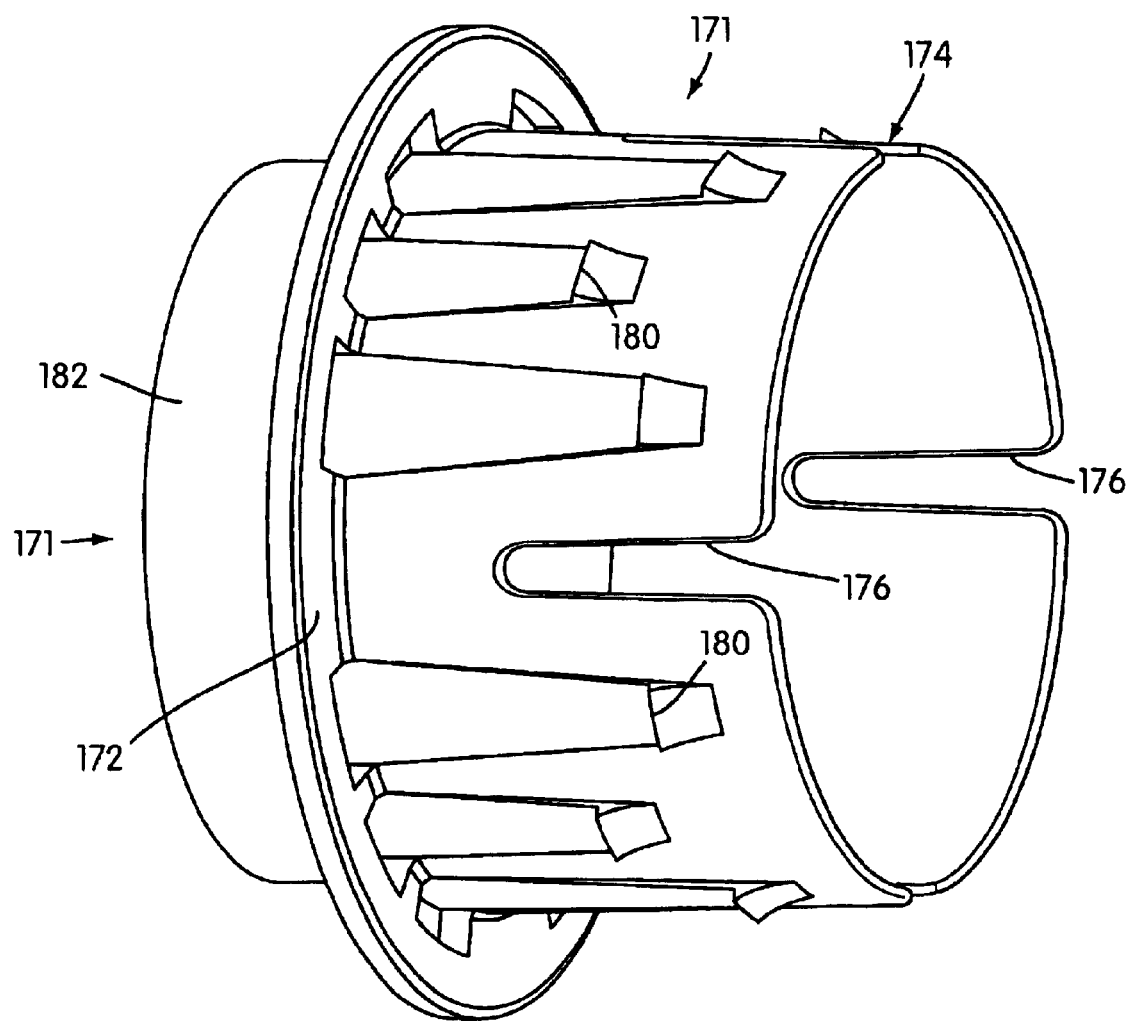
FIG. 12 is a perspective view of an alternative embodiment of a feed roll end cap.

An alternative embodiment of an end cap and expansion member are shown in FIGS. 12 through 14. The end cap 171 includes an outer braking flange 172 and a core securing portion 174. The braking flange 172 provides a surface constructed and arranged to engage a braking surface on a feed roll mounting structure. The core securing portion 174 includes four notches 176 which allow the core supporting portion to move radially inwardly when the end cap is being inserted into the core 132 to allow the same to easily enter the interior of a core of a feed roll in which the end cap is to be mounted.

The engagement of the teeth 180 with the interior of the core causes the interior of the core securing portion 174 to taper slightly inwardly in a direction from the open end of the core towards the interior of the core. An expansion member 182 is integrally molded as one piece with the end cap and is removably secured thereto by frangible or "break away" plastic portions. This allows the expansion member 182 to be pre-positioned for insertion into the interior of the end cap. Also, this reduces the part count and assembly cost of the cartridge. The expansion member 182 can thus be inserted into the interior of the core securing portion 174 of the end cap in radially expanding relation therewith by simply pushing the member 182 toward the center of the core.

An end view and a cross-sectional view of the end cap 171 and integral expansion member 182 mounted thereto are shown in FIGS. 13 and 14, respectively. FIG. 14 illustrates the frangible engagement between the end cap 171 and the expansion member 182. Specifically, the end cap 171 and expansion member 182 are connected together by break away integral plastic structure 184. It can also be appreciated from FIG. 14 that the front surfaces of the teeth 180 are arcuate for easy insertion into the core.

Figure 15:
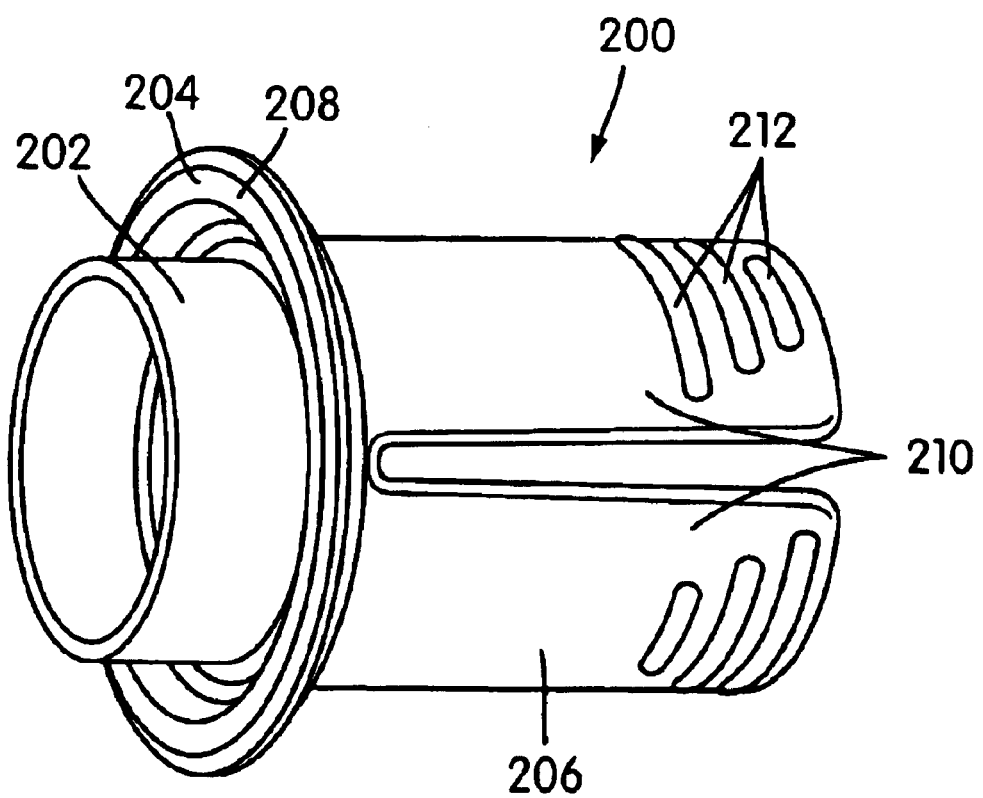
FIG. 15 is a perspective view of another embodiment of a feed roll end cap.
Figure 18:
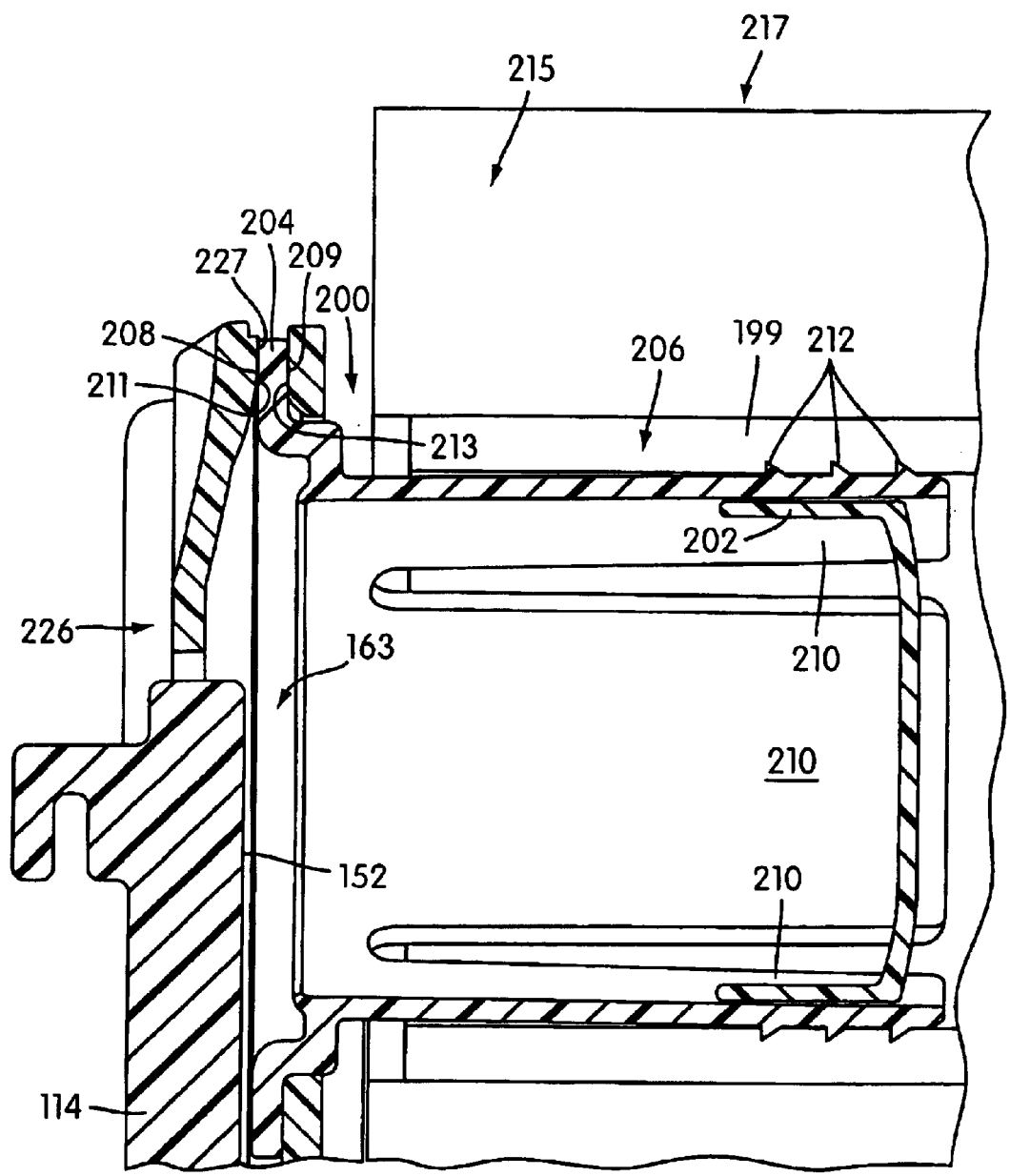
FIG. 18 is a cross-sectional view similar to FIG. 17 except showing a cross-sectional view of a portion of an end cap mounted in the holding member.

Another alternative embodiment of an end cap 200 and an expansion member 202 are shown in isolation in FIG. 15 and mounted on a core 199 in FIG. 18. The end cap 200 includes an outer annular braking flange 204 and a core securing portion 206. The braking flange 204 provides brake surfaces 208, 209 constructed and arranged to engage braking surfaces 211, 213 on a feed roll mounting structure 215 (see FIG. 18). The core securing portion 206 includes four flexible tabs 210 which move radially inwardly when the end cap 200 is being inserted into the interior of a core 199 to allow the core securing portion 206 to easily enter the interior of the core 199 of a feed roll 217 on which the end cap 200 is to be mounted.

A series of raised ridge structures 212 of various sizes are formed on an outer free end of each tab 210. As the core securing portion 206 is inserted into the interior of a core 199, the engagement of the ridges 212 first with the edge of the end of the core 199 and then with the interior of the core 199 causes the tabs 210 to flex slightly inwardly to facilitate insertion of the core securing portion 206 into the interior of the core 199.

The expansion member 202 is integrally molded as one piece structure (see FIG. 15) with the end cap 200 and is removably secured thereto by frangible or "break away" plastic portions. This prepositions the expansion member 202 for insertion into the interior of the core securing portion 206 of the end cap 200. After the core securing portion 206 is inserted the proper distance into the core, the expansion member 202 is inserted into the interior of the core securing portion 206 in radially expanding relation therewith by pushing the member 202 toward the center of the core 199 (see FIG. 18). The expansion member 202 is connected by the frangible connection to the respective end cap 200 in axial alignment with the tubular core securing portion 206 such that the breaking of the frangible connection and the inserting of the expansion member may both be accomplished by applying an axially (inwardly) directed force to the expansion member 202.

The member 202 causes the teeth-like ridge structures 212 to imbed in the inner surface of the core 199 (see FIG. 18) to hold the end cap 200 in the core 199. More specifically, the tubular core securing portion is generally in the form of a cylindrical tube 62 having a split free end. The split free end defines a plurality of tabs 210, each tab 210 including gripping structure 212 on the exterior thereof. The inserting of the expansion member into the core securing portion radially expands the core securing portion such that the tabs flex outwardly and the gripping structures 212 grip the paper or cardboard core 199 (as shown in FIG. 18).

Figure 16:
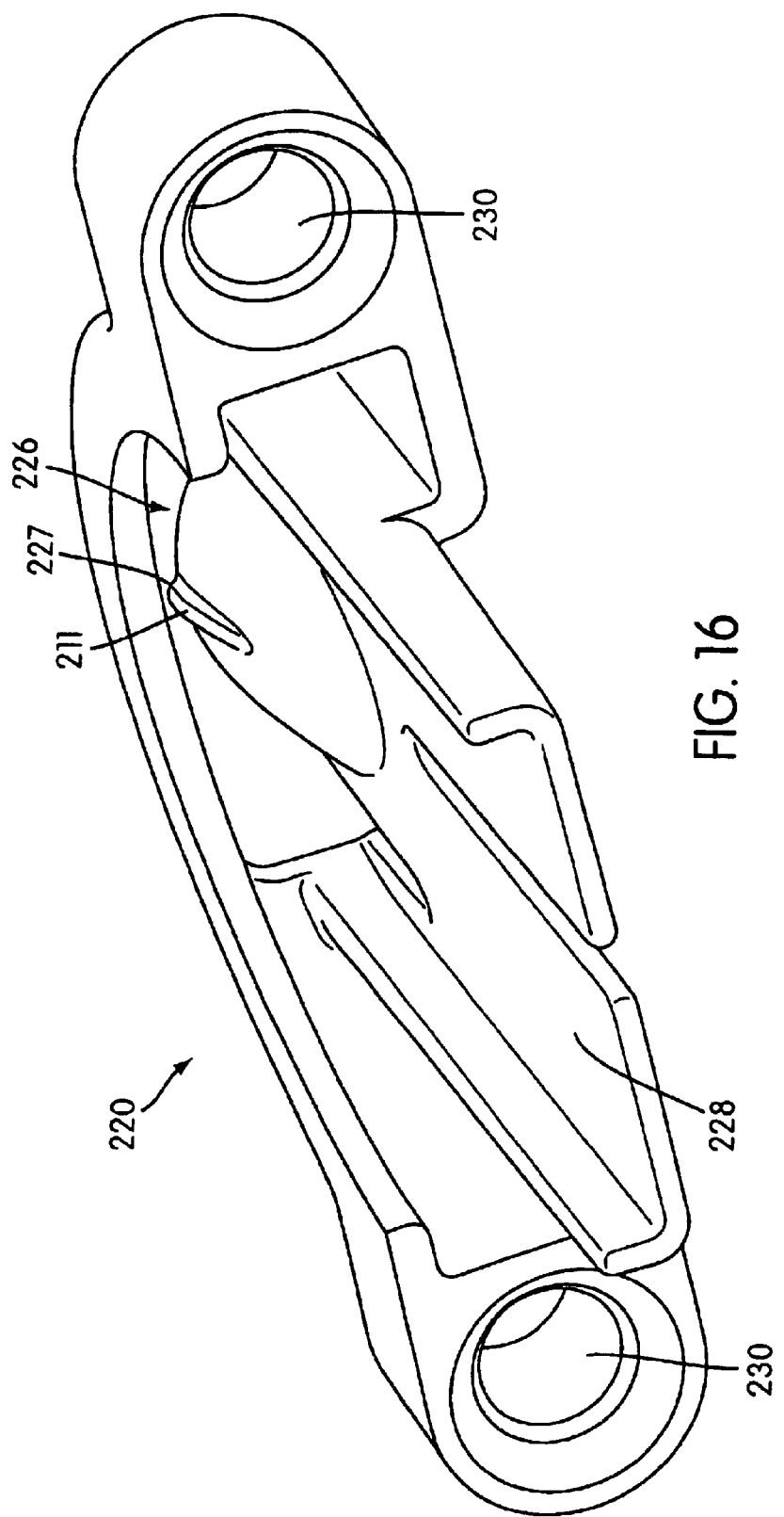
FIG. 16 is a perspective view of another embodiment of a holding member.
Figure 17:
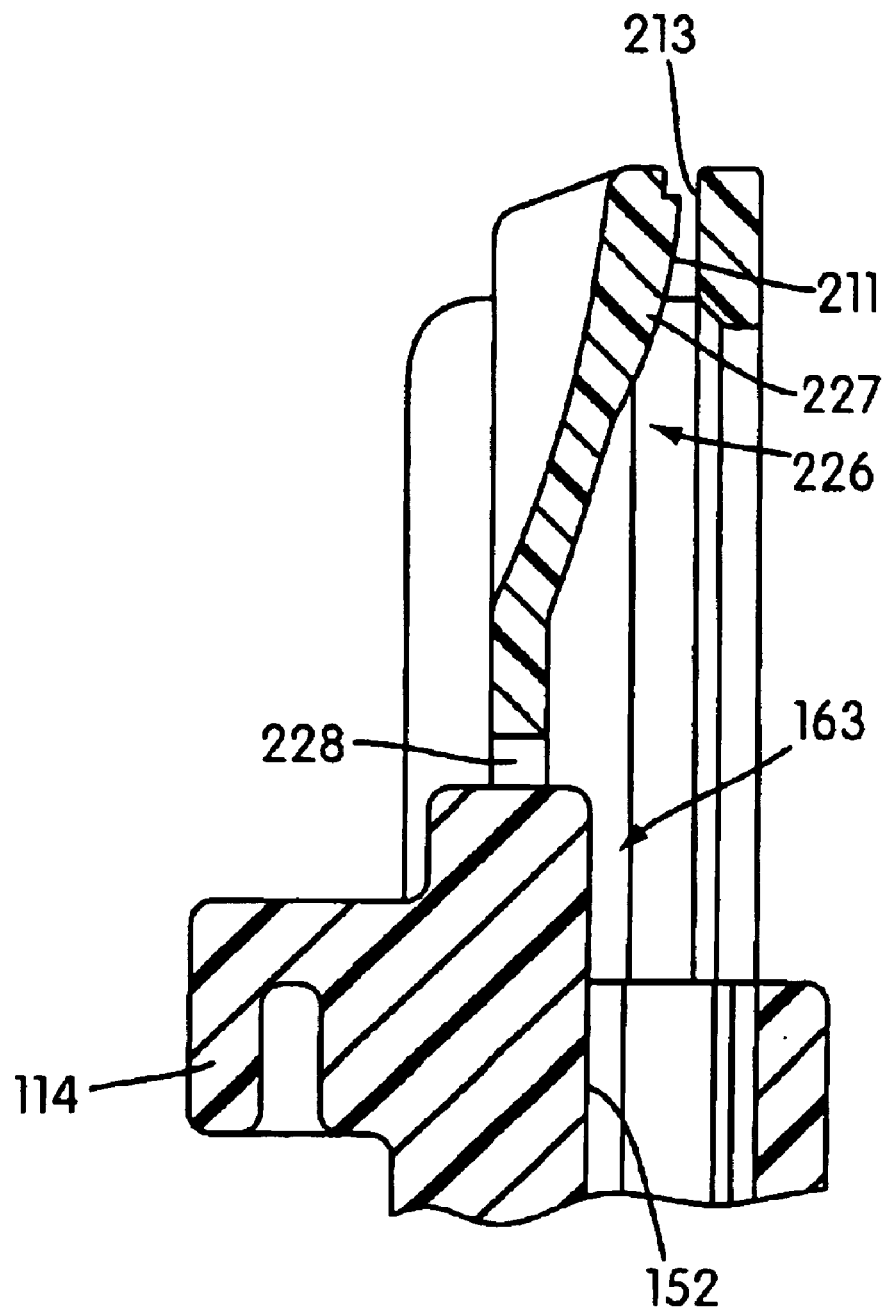
FIG. 17 is a cross-sectional view of a portion of the holding member taken through the line 17—17 of FIG. 16.

Another example of a braking arrangement 219 can be understood with reference to FIGS. 16–18. The brake arrangement 219 includes a holding member 220 shown in isolation in FIG. 16, for example. The holding member 220 is shown attached to holding structure 152 formed on a cartridge body structure 114 with the feed roll removed in FIG. 17 and is shown with a feed roll mounted therein in FIG. 18. The cartridge body structure 114 and the holding structure 152 of the feed roll mounting structure 215 are identical to the cartridge body structure 114 and the holding structure 152 described above. Thus, the holding structure 152 functions primarily as a bearing structure that rotatably supports the associated end cap. As mentioned above, when the holding member 220 is attached to the cartridge body structure 114, the holding member is considered to be part of the cartridge body structure 114.

The holding member 220 and the holding structure 152 of the alternative brake arrangement 219 cooperate to rotatably mount the end cap 200 of a feed roll. The holding member 220 is a molded plastic structure (although any appropriate material can be used in its construction) that is identical to holding member 154 except that holding member 220 includes an integral braking structure 226 that extends outwardly from a wall portion 228 of the holding member 220. The wall portion 228 is received within a slot 163 on the cartridge body structure 114 and the holding member 220 is secured to the cartridge body structure 114 by securing posts (not visible in FIGS. 17 an 18) on the cartridge body structure 114 within openings 230 on the holding member 220 (see FIG. 16) in the same manner the holding member 154 is secured to the cartridge body structure 114.

The amount of force required to unwind a stock material from a core decreases as the stock material is removed from the core. That is, the amount of force required to unwind a stock material from a core is relatively high when the roll has a relatively large radius and that the amount of force required to unwind a stock material from a core is relatively low when the roll has a relatively small radius. The reason why the amount of force required to unwind the roll depends on the radius of the feed roll can be understood by noting that, generally speaking, one complete revolution (360°) of a feed roll can be thought of as removing the "outer layer" of stock material from the feed roll. The surface area, A, of the outer layer of stock material can be approximated by calculating the product of the radius of the feed roll times the length of the feed roll. That is, $$\text{Surface Area of the Outer Layer} = A = (2\pi r)(L) \qquad \text{Equation (1)}$$

Where r=the radius of the feed roll, and L=the length of the feed roll. When the radius of a feed roll is relatively large, the area of the outer layer is relatively high. When the radius of a feed roll is relatively small, the area of the outer layer is relatively small. Because one side of the stock material is covered with an adhesive, the larger the area A that is separated from the feed roll per revolution, the more unwinding force is required to be applied per revolution.

Thus, a greater amount of force is required to rotate the feed roll through one complete revolution (360°) when r is relatively high than is required to rotate the feed roll through one revolution when r is relatively low. This is true even though the lever arm of the applied unwinding force depends on (and is approximately equal to) the radius, r, of the feed roll because the area of the adhesive covered stock material that is separated from the feed roll per revolution is a function of r so that as r increase, A increases by a multiple of r according to equation (1). Thus, the area of the roll of stock material that is removed from the feed roll per revolution decreases as the stock material is removed from the core. The pre-tension brake 219 is constructed and arranged to apply less braking friction to the core as the core is rotated so that the braking tension decrease as stock material is unwound and depleted from each core so that the amount of force required to unwind stock material therefrom remains approximately constant as the stock material is depleted.

The manner in which this is accomplished can be understood with reference to FIGS. 16–18. The holding member 220 includes braking surfaces 211, 213 which apply braking friction to respective opposite sides 208, 209 of the flange portion 204 of the end cap 200 (see FIG. 18). The braking structure 226 is a flexible structure and provides one of the braking surfaces 211 thereon (see FIG. 16, for example). FIG. 17 shows the braking structure 226 in a relaxed condition (because the end cap 200 is not mounted therein). When the end cap 200 is inserted in the holding member 220, the opposite sides 208, 209 of the flange 204 frictionally engage the pair of braking surfaces 211, 213 and the braking structure 226 is in a relatively highly flexed condition (see FIG. 18) so that the pair of braking surfaces 211, 213 provide a relatively high degree of braking friction to the core.

The molded plastic of the braking structure 226 is constructed and arranged to wear down as the stock material is unwound from the associated core 199. More specifically, as the surfaces 211, 208 and 213, 209 move past one another during unwinding motion of the core 199 and end cap 200, the surface 211 of structure 227 wears away, thereby progressively lessening the degree of flexure of the braking structure 226. It can be appreciated from FIG. 16 that the surface area of structure 211 is relatively small so that the structure 227 wears away relatively quickly. A suitable plastic material for constructing the holding member 220 (including the braking structure 226) and the cartridge body structure 114 is a plastic in the styrene family or an ABS plastic and a suitable plastic material for constructing the end cap 200 (including the flange 204) is a plastic in the acetyl family, particularly plastics commercially available under the trade names DELRIN® and CELCON®. The example holding member 220 is constructed of a polystyrene having a Rockwell R Hardness of about 110 and the end cap 200 is constructed of an acetyl having a Rockwell R Hardness of about 120. The hardness of the materials is a relatively minor factor in the wearing down of the structure 227. A more important factor causing the structure 227 to wear down is the relatively small surface area 211 of the structure 227 that is in frictional engagement with the end cap 200. The area of the wearing surface 211 of the structure 227 is relatively small compared to the surface area of the corresponding brake surface 208 on the end cap 200 and this difference in surface area between the surfaces 211, 208 contributes to the relatively rapid wearing down of the structure 227. Of course, one could make modifications between material hardness and surface area relative to one another as desired. As mentioned, as the structure 227 wears down, the braking structure 226 moves back toward its relaxed position. As the braking structure 226 moves back to toward its relaxed position, the amount of braking friction applied by the braking surfaces 211, 213 to the core progressively decreases so that the amount of force required to unwind stock material decreases as the stock materials are depleted. The holding member 220 and the cartridge body structure 114 may each be made of a polystyrene so that the plastic parts which form the bearing surfaces (which are provided by parts of the holding structure 152) and the parts which form the braking surfaces (surfaces 211, 213 of holding member 220) are made of like material. Acetyl is a preferred material for constructing the end cap 200 in the instance in which the cartridge body structure 114 and holding member 220 are made of a polystyrene for several reasons, in part because acetyl makes an excellent bearing and in part because frictional engagement between unlike materials (that is, the styrene and the acetyl) provide quiet operation of the brakes. Like materials tend to make noise (a squeeling noise, for example) when they are rubbed together.

The pre-tension brake 219 also performs other functions that facilitate operation of the apparatus. For example, frictional engagement between the flange 204 and the braking surfaces 211, 213 dampens or moderates the rotational movement of the associated feed roll to prevent wrinkling of the stock material during a master processing operation. The braking force is created because the flange 204 is received in an interference fit relation between the braking surfaces 211, 213. The interference fit provides the braking friction when the flange 204 moves relative to the surfaces 211, 213.

The pre-tension brake 219 can be constructed to be used with feed rolls that are individually mounted to the apparatus frame directly without the use of a cartridge, as disclosed in the above-incorporated '962 patent. In this case, the brake at each end of the feed roll (or at one end of each feed roll in the instance in which only one brake is used per feed roll) is incorporated in feed roll mounting structure carried on the ends of the feed rolls. This feed roll mounting structure removably mounts to the apparatus frame to support its associated feed roll. The feed roll mounting structure cooperates with the frame so that both the feed roll mounting structure and its pre-tensioning brake remain stationary as the core rotates during unwinding of the stock material. The brake for each individual feed roll will provide braking surfaces similar to the braking surfaces and in the cartridge to provide frictional resistance to the flange.

Operation

To perform a master processing operation, the latch assembly 112 is unlatched and the second frame portion 102 is moved into its open position (FIG. 4). A cartridge 46 is placed inside the frame 12 and leading portions 24, 26 of the stock materials 21, 23 from the upper and lower feed rolls 18, 20, respectively, are unwound and placed between the nip roller 32, 34. The second frame portion 102 is returned to its closed position, which moves the nip rollers 32, 34 into engagement with one another and into pressure applying engagement with the portion of the stock materials positioned therebetween. Each nip roller 32, 34 has a rigid metal core 190 and an outer layer 192 of a resilient, rubber-like material. The upper nip roller 32 is held in proper alignment with respect to the lower nip roller 34 by the operation of the roller guide tracks as described above.

A document or other master 22 to be covered with stock material is placed on the substrate support surface 48 of the feed tray 44 and pushed through the feed opening 14 in the frame 12 and through the cartridge front opening 116 in the replaceable cartridge 46 until a document comes into contact with the unwound portions 24, 26 of the stock materials 21, 23. At least one of the unwound portions 24, 26 is coated with an adhesive so that the document adheres thereto. The operator than rotates the crank handle 36 which causes the nip rollers 32, 34 of the master processing assembly 30 to rotate so as to drive the master 22 and the stock materials therebetween and outwardly towards the discharge opening 16 in the frame 12. As the stock materials (with or without the master 22 therebetween) pass between the nip rollers 32, 34, the nip rollers apply pressure to the stock materials to activate the pressure sensitive adhesive and adhere the stock materials to opposing sides of the master 22 and/or to one another.

The master engaging structure 124 applies a frictional force to the master as it is pulled between the driving rollers 32, 34 which tends to keep the master 22 flat and taut as it passes between the rollers 32, 34. The brake surfaces 148, 150 provided by the feed roll mounting structures 146 frictionally engage the annular flanges 144 which keeps the unwound portions 24, 26 of the stock materials between the feed rollers in the nip rollers 32, 34 taut. This prevents wrinkling of the stock material on the master 22 and also prevents the unwound portions of the stock materials from adhering to themselves or to each other before they pass between the nip rollers.

When the entire length of the master 22 has been covered with stock material 21, 23, the final product 38 passes through the discharge opening 16. When the master has cleared the discharge opening, the operator stops rotation of the crank handle 36 and uses the blade 82 of the cutting assembly 70 to sever the finished product 38 from the continuous strip of stock materials 21, 23. To cut the laminated master from the sheets of stock material, preferably the operator slides the blade carriage 80 to one end of the guide member 74 and then applies a downward prerssure on the carriage sufficient to cause the blade to penetrate the adhered layers of stock material behind the laminated master. The operator then slides the blade carriage to the opposite end of the guide member 74 while simultaneously applying sufficient downward pressure to the blade carriage to pinch the guide member 74 against the portion of the adhered stock materials that are being severed. The holding structures 194, 196 hold the stock materials taut over the blade slot to facilitate cutting.

It can be appreciated from FIG. 3 that the cutting assembly 70 is arranged to position the blade 82 close to the nip rollers 32, 34. This allows the operator to sever the stock materials very near the nip rollers which reduces the amount of waste of stock materials. It can also be appreciated from FIG. 3 that the cutting assembly 70 is constructed to position and angle the cutting blade 82 away from the discharge opening 16 so that the operator is protected from possible contact with the blade 82 while handling or operating the apparatus 10. The bottom surface of the guide member 74 is provided with a pair of transversely extending holding structures 194, 196 which press or "pinch" portions of the adhered stock materials on either side of the blade slot against the support surface 40 to facilitate the cutting action of the blade 82.

Figure 19:
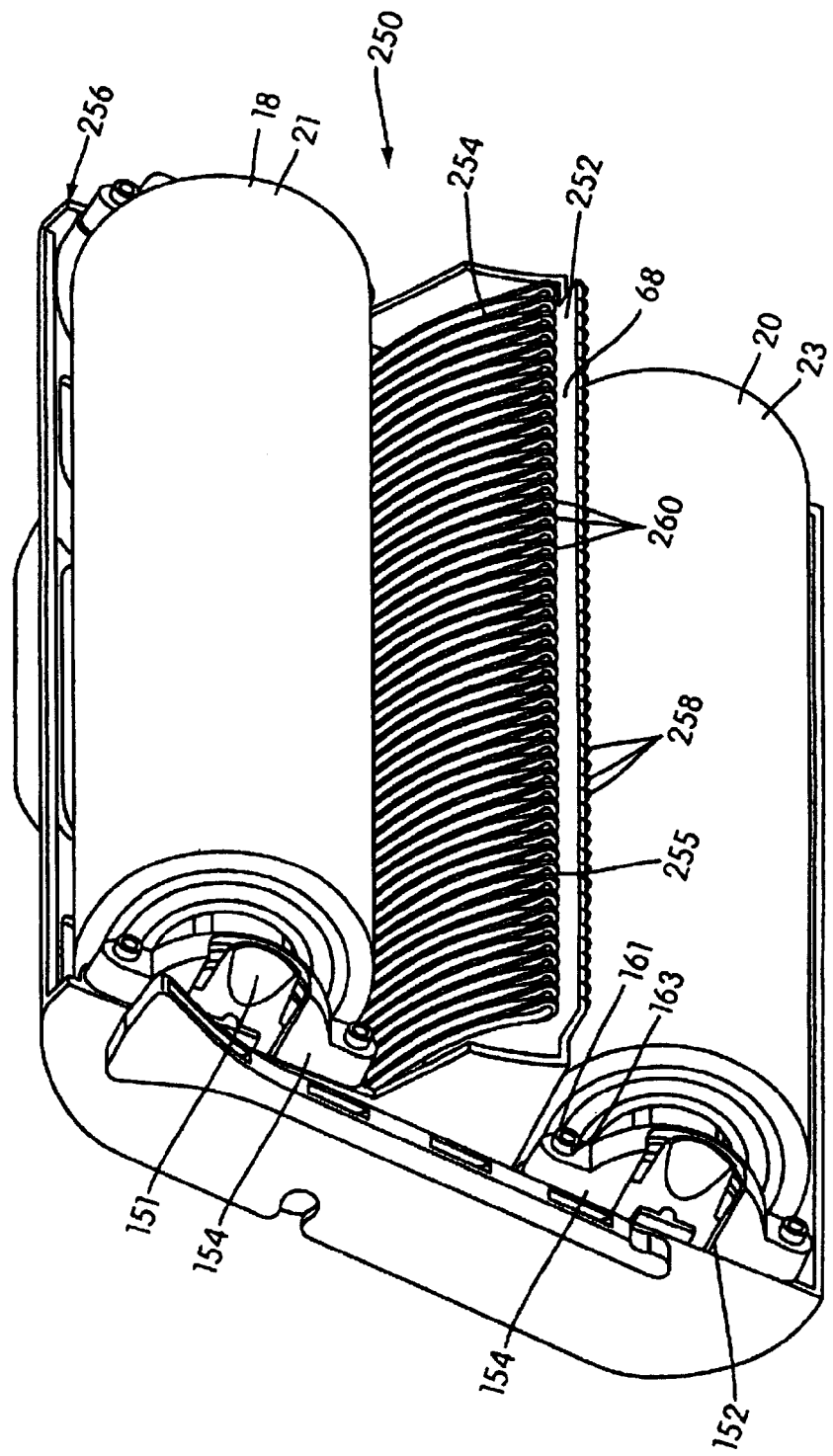
FIG. 19 shows another embodiment of a cartridge.

The present invention is explained and described with reference to a number of illustrative embodiments and variations thereof that are shown in the drawings and/or described herein. These embodiments are intended to illustrate the principles of the invention only, and not to limit the scope of the invention. Other variations and embodiments are contemplated and within the scope of the invention. For example, FIG. 19 shows another embodiment of a cartridge 250. The cartridge 250 is essentially the same as the cartridge 46 except that a substrate supporting member 252 and a master engaging structure 254 of the cartridge 250 are constructed differently from the substrate supporting member 118 and the master engaging structure 124 of the cartridge 46. Portions of the cartridge 250 that are identical to portions of the cartridge 46 are identified with identical reference numerals and are not commented upon further.

The cartridge 250 includes a cartridge body structure 256. The substrate supporting member 252 is integrally formed in the cartridge body structure 256 and includes a substrate support surface 68 for supporting a master. A plurality of ribs 258 are formed on the substrate supporting member 252 on the side opposite the substrate support surface 68. The master engaging structure 254 includes a plurality of ribs 260. The ribs 260 are formed on an upper side of the master engaging structure 254 and on the master engaging surface 255 thereof. The ribs 258, 260 reduce the tendency of and effectively prevent the exposed adhesive on the unwound portions (not shown in FIG. 19) of the stock materials between the feed rolls and the nip rollers (not shown in FIG. 19) from adhering to the upper surface of the master engaging structure 254 and the lower surface of the substrate supporting member 252. The ribs 258, 260 in effect reduce the surface areas of the master engaging structure 254 and the substrate supporting member 252 facing the exposed adhesive on the stock materials and thereby prevent the adhesive from strongly adhering to the substrate supporting member 252 and the master engaging structure 254. Although the unwound portions of the stock materials are generally taut and therefore do not contact the substrate supporting member 252 and the master engaging structure 254, contact can occur during transport of the master processing apparatus, for example, or when the master engaging structure 254 is moved upwardly during insertion of a master in the feed opening of the apparatus and so on. The portion of the ribs 260 on the master engaging surface 255 may reduce the total area of the contact surface between the master engaging structure 254 and a master while allowing the master engaging structure 254 to apply sufficient frictional resistance to tension the master. Reducing the area of the contact surface between the master engaging structure 254.

In another alternative embodiment for laminating apparatuses, the stock materials may be coated with a heat-activated adhesive. In such an apparatus, heating elements would be provided in the master processing assembly 30 upstream of the nip rollers (or other pressure applying structures) to soften or melt the adhesive prior to application of pressure by the nip rollers. For example, a pair of heating platens could be positioned on opposing sides of the stock materials in order to heat the adhesive prior to reaching the nip rollers. Alternatively, heating elements could be provided in the nip rollers themselves so as to simultaneously heat and apply pressure to the stock materials. The master processing assembly used in an apparatus constructed in accordance with this invention may have any suitable construction.

It can be appreciated that the embodiments of the master processing apparatus shown and described herein are examples of the invention and are therefore intended only to illustrate the principles of the invention, but not limit the scope of these principles.

What is claimed is:

1. A master processing apparatus for use with a pair of removable feed rolls, each carrying a supply of stock material to be unwound, at least one of the stock materials having a layer of adhesive provided thereon, said apparatus comprising:

a frame including a first frame portion and a second frame portion movably connected for movement relative to one another between open and closed positions;

a pair of cooperating pressure applying structures mounted within said frame, said cooperating structures being constructed and arranged to be positioned adjacent one another in a cooperating pressure applying relationship wherein, when the master with the first and second stock materials on opposing sides thereof and with the adhesive contacting the master is positioned between said cooperating structures, said cooperating structures apply pressure to said master and stock materials as they pass therebetween so as to affect adhesive bonding between said master and said stock materials;

one of said pair of cooperating pressure applying structures being mounted on the first frame portion and the other of said pair of cooperating pressure applying structures being mounted on the second frame portion such that (a) movement of the frame portions into their open positions moves the pressure applying structures apart from one another into an open access position to facilitate positioning of the stock materials therebetween and (b) movement of the frame portions into their closed positions moves the pressure applying structures into engagement with one another and into pressure applying engagement with the portion of the stock materials positioned therebetween; and guide structure providing a guide surface constructed and arranged to guide the movement of the pressure applying structures into the engaged position thereof.

2. A master processing apparatus according to claim 1, further comprising a locking mechanism mounted between the first and second frame portions and movable between (a) a locking position in which said locking structure holds the first and second frame portions in their closed positions with respect to one another and thereby holds the pressure applying structures in engagement with one another and with the portion of the stock materials therebetween as aforesaid and (b) an unlocked position in which the first and second frame portions are released from locked engagement with one another to allow said first and second frame portions to be moved into their open positions with respect to one another to move the pressure applying structures apart as aforesaid.

3. A master processing apparatus according to claim 2, wherein said pair of pressure applying structures comprises a first nip roller mounted to said first frame portion and a second nip roller mounted to said second frame portion.

4. A master processing apparatus according to claim 3, wherein said first and second frame portions are pivotally connected for movement between said open and closed positions.

5. A master processing apparatus according to claim 4, wherein said guide structure includes a pair of guide tracks on one of said frame portions and a pair of guide projections on the other of said frame portions, each projection being movably received within a respective guide track.

6. A master processing apparatus according to claim 5, wherein said first frame portion includes a pair of opposing walls, each said guide track being formed in a respective one of said opposing walls, and wherein each projection is formed on said second frame portion.

7. A master processing apparatus according to claim 6, wherein each guide track is arcuate.

8. A master processing apparatus according to claim 7, wherein each said guide projection is coaxial with the axis of rotation of said second nip roller, said guide tracks and said guide projections cooperating such that as the frame portions are moved toward and into their closed position, the guide tracks guide the guide projections to thereby guide the nip rollers toward and into parallel uniform pressure applying engagement with one another and with the stock material.

9. A master processing apparatus according to claim 8, wherein each said guide projection is biased into engagement with wall surfaces of the associated guide track when the first and second frame portions are in their closed positions to maintain the first and second nip rollers in uniform pressure applying engagement with one another and with stock material as aforesaid.

10. A master processing apparatus for use with a pair of removable feed rolls, each carrying a supply of stock material to be unwound, at least one of the stock materials having a layer of adhesive provided thereon, said apparatus comprising:

a frame including a first frame portion and a second frame portion movably connected for movement relative to one another between open and closed positions, one of said first and second frame portions including a guide surface spaced from the movable connection between said first and second frame portions, the other of said first and second frame portions having a guide portion engageable with said guide surface; and a pair of cooperating pressure applying structures mounted within said frame, said cooperating structures being constructed and arranged to be positioned adjacent one another in a cooperating pressure applying relationship wherein, when the master with the first and second stock materials on opposing sides thereof and with the adhesive contacting the master is positioned between said cooperating structures, said cooperating structures apply pressure to said master and stock materials as they pass therebetween so as to affect adhesive bonding between said master and said stock materials;

one of said pair of cooperating pressure applying structures being mounted on the first frame portion and the other of said pair of cooperating pressure applying structures being mounted on the second frame portion such that (a) movement of the frame portions into their open position moves the pressure applying structures apart from one another into an open access position to facilitate positioning of the stock materials therebetween and (b) movement of the frame portions into their closed position moves the pressure applying structures into engagement with one another and into pressure applying engagement with the portion of the stock materials positioned therebetween;

said guide portion and said guide surface being configured to cooperate during movement of said first and second frame portions relative to one another from their open position to their closed position so as to guide the relative movement of said frame portions to align said cooperating structures with one another in their cooperating pressure applying relationship.

11. A master processing apparatus according to claim 10, further comprising a locking mechanism mounted between the first and second frame portions and movable between (a) a locking position in which said locking structure holds the first and second frame portions in their closed position with respect to one another and thereby holds the pressure applying structures in engagement with one another and with the portion of the stock materials therebetween as aforesaid and (b) an unlocked position in which the first and second frame portions are released from locked engagement with one another to allow said first and second frame portions to be moved into their open position with respect to one another to move the pressure applying structures apart as aforesaid.

12. A master processing apparatus according to claim 10, wherein said pair of pressure applying structures comprises a first nip roller mounted to said first frame portion and a second nip roller mounted to said second frame portion.

13. A master processing apparatus according to claim 10, wherein said first and second frame portions are pivotally connected for movement between said open and closed positions.

14. A master processing apparatus according to claim 10, wherein said guide surface is provided by a pair of guide tracks on said one of said first and second frame portions and said guide portion is provided by a pair of guide projections on the other of said first and second frame portions, each projection being received within a respective guide track.

15. A master processing apparatus according to claim 14, wherein said first frame portion includes a pair of opposing walls, each said guide track being provided on a respective one of said opposing walls, and wherein each projection is provided on said second frame portion.

16. A master processing apparatus according to claim 15, wherein each said guide projection is coaxial with the axis of rotation of said cooperating structure on said second frame portion.

17. A master processing apparatus according to claim 13, wherein said guide surface is provided by a pair of arcuate guide tracks on said one of said first and second frame portions and said guide portion is provided by a pair of guide projections on the other of said first and second frame portions, each projection being received within a respective guide track.

18. A master processing apparatus according to claim 17, wherein said first frame portion includes a pair of opposing walls, each said guide track being provided on a respective one of said opposing walls, and wherein each projection is provided on said second frame portion.

19. A master processing apparatus according to claim 18, wherein each said guide projection is coaxial with the axis of rotation of said cooperating structure on said second frame portion.

20. A master processing apparatus according to claim 17, further comprising a locking mechanism mounted between the first and second frame portions and movable between (a) a locking position in which said locking structure holds the first and second frame portions in their closed position with respect to one another and thereby holds the pressure applying structures in engagement with one another and with the portion of the stock materials therebetween as aforesaid and (b) an unlocked position in which the first and second frame portions are released from locked engagement with one another to allow said first and second frame portions to be moved into their open position with respect to one another to move the pressure applying structures apart as aforesaid.

21. A master processing apparatus according to claim 17, wherein said pair of pressure applying structures comprises a first nip roller mounted to said first frame portion and a second nip roller mounted to said second frame portion.

* * * * *